United States Patent [19]

Ehrat et al.

[11] 4,143,279

[45] Mar. 6, 1979

[54] METHOD AND APPARATUS FOR TESTING THE PRINT QUALITY OF PRINTED TEXTS, MORE PARTICULARLY BANKNOTES

[75] Inventors: Kurt Ehrat, Steinmaur; Fred Mast, Wil; Ernst Huber, Wettingen; Josef Huber, Zurich, all of Switzerland

[73] Assignee: Gretag Aktiengesellschaft, Regensdorf, Switzerland

[21] Appl. No.: 791,140

[22] Filed: Apr. 26, 1977

[30] Foreign Application Priority Data

Apr. 30, 1976 [CH] Switzerland ........................ 5450/76
Apr. 30, 1976 [CH] Switzerland ........................ 5451/76

[51] Int. Cl.² ................................................ G06K 5/00
[52] U.S. Cl. ....................................... 250/556; 356/71
[58] Field of Search .................... 250/556, 559; 356/71

[56] References Cited

U.S. PATENT DOCUMENTS

| | | | |
|---|---|---|---|
| 2,731,621 | 1/1956 | Sontheimer | 250/566 X |
| 3,196,392 | 7/1965 | Horowitz et al. | 356/71 X |
| 3,496,371 | 2/1970 | Endo | 356/71 |

*Primary Examiner*—Lawrence J. Dahl
*Attorney, Agent, or Firm*—Burns, Doane, Swecker & Mathis

[57] ABSTRACT

A method and apparatus for detecting printing faults or errors in a sample of printed material, such as a bank note, by determining the relative positions of corresponding text on the sample and each of a number of original bank notes, each having been printed by a different printing process used in printing the sample combining the text of the originals optically or electronically taking into account the positions of the text in the originals relative to the text on the sample resulting from superimposition of the text produced by each of the printing process used to produce each original, and comparing the text of the sample with the total combined text. The relative positions of corresponding text on the sample and originals is determined by scanning the sample and originals and obtaining reflectances values at each of a number of corresponding raster points and correlating the corresponding reflectance values to obtaining the relative position values.

31 Claims, 40 Drawing Figures a)

b)

c)

METHOD AND APPARATUS FOR TESTING THE PRINT QUALITY OF PRINTED TEXTS, MORE PARTICULARLY BANKNOTES

FIELD OF THE INVENTION

This invention relates to a method of and apparatus for testing the quality of printed texts, the contents of which are composed of at least two texts originating from different printing processes, by comparing a sample with an original and assessing the sample by reference to the result of the comparison. The expression "text" as use in this context denotes either words, pictures, or other indicia.

PRIOR ART

In the printing of new banknotes a very high printing quality is required. For example, printing faults of the magnitude of about 0.1 $mm^2$ are unacceptable. The most accurate possible quality control of the printed texts of all newly printed banknotes is therefore necessary. Today this quality control is carried out visually and in view of the large number of banknotes to be tested (e.g. 1 million per day) is labour-intensive. In addition to high labour costs, the quality of visual control depends on the concentration and fatigue of the testers. For these reasons, mechanical quality control of the printed texts is desirable.

If all printed texts or banknotes were really identical in every geometrical detail and in colour, mechanical control by comparison with standard printing texts would be relatively simple. For example, the original could be in the form of a photographic 1:1 negative and this could be brought into register with the banknote texts under test, whereupon only the printing faults or errors being sought would remain in the text area.

In practice, however, the texts of banknotes under test differ considerably from one another and have permissible deviations which cannot be assessed as printing faults or errors, so that the aforementioned control method is inapplicable. These acceptable text deviations include the following:

The difference in the relative position of corresponding text on different banknotes up to 1.5 mm originating from different printing processes (intaglio, offset printing, and letterpress), register errors of up to about 1 mm, irregular distortion of the banknotes which differs from one banknote to another and which is due particularly to paper compression and clamping in the case of intaglio printing, large-area variations in colour tone of up to about 6%, deviations in the position of colour transitions, e.g., from red to green, by several millimeters, deviations of the position of the watermark, deviations in the grain of banknote paper, and individual errors in areas of up to about 0.02 $mm^2$ where they are dispersed over the note text or are spaced more than 1 mm apart.

Many of these acceptable deviations between the printed texts of the various banknote samples being tested are greater than the smallest printing fault or error which can still be detected, i.e. of a size of about 0.1 $mm^2$ (e.g. 0.3 × 0.3 $mm^2$, or 0.05 × 2 $mm^2$).

OBJECT OF INVENTION

The object of this invention therefore is to provide a method of quality control suitable more particularly for mechanical operation whereby genuine printing faults or errors can be separated from the acceptable deviations.

SUMMARY OF INVENTION

According to the invention, separate originals each having text originating from a different printing process is used, the relative position in relation to the sample is determined in respect of each original, the text of the individual originals are combined e.g. optically or electronically, to form a total original text taking into account the relative positions of the originals in accordance with the text printed one above the other on the sample, and the texts of the sample are compared with the total original text.

The invention also relates to apparatus for performing the method. The apparatus includes a first photoelectric scanning system operating pointwise for producing reflectance values of each individual scanning raster point, a second and a third scanning device identical to the first at least in respect of the scanning raster, or a first and second store each adapted to be connected to the first scanning device and each having a number of storage places corresponding to the number of scanning raster points, a relative position measuring circuit following the scanning devices or stores for determining the relative positions of corresponding text points of the sample and original printed texts scanned in the three scanning devices simultaneously or in the first scanning device successively, and a text comparator circuit which also follows the scanning devices or stores and which comprises two correlator stages which are connected to the second and third scanning devices and the first and second stores and to the relative position measuring circuit, and which correlate the reflectance values originating from corresponding text points on the original texts scanned in the second and third scanning devices and stored in the first and second stores in accordance with the relative position values of these original printed texts determined by the relative position measuring circuit, and the sample printed text scanned in the first scanning device, and the corresponding text points of the sample printed text, and comprising a logic operation stage for subjecting the associated reflectance values of the original printed texts to the logic operation, and a comparator stage for comparing the original reflectance values after being subjected to the logic operation, and the associated reflectance values of the sample printed text, and a fault computer following the comparator stage for evaluation of the results of the comparison.

BRIEF DESCRIPTION OF THE DRAWINGS

A preferred embodiment of the invention will be explained hereinafter in detail with reference to the accompanying drawing wherein:

**FIGS. 3*a*–8*c*** show examples of raster zones and their reflectance curve.

FIGS. 14*a* to 14*c* are details of scanning rasters.

FIGS. 15 and 16 are block schematic diagrams of other details of FIG. 1, FIGS. 17 to 24 are diagrams further explaining the low-pass filtering, FIGS. 25*a* to 28*c* are diagrams for explanation of the evaluation of errors, and FIGS. 29*a* to *f* show examples of "fault hills".

DETAILED DESCRIPTION OF PREFERRED EMBODIMENTS

Figure 1:
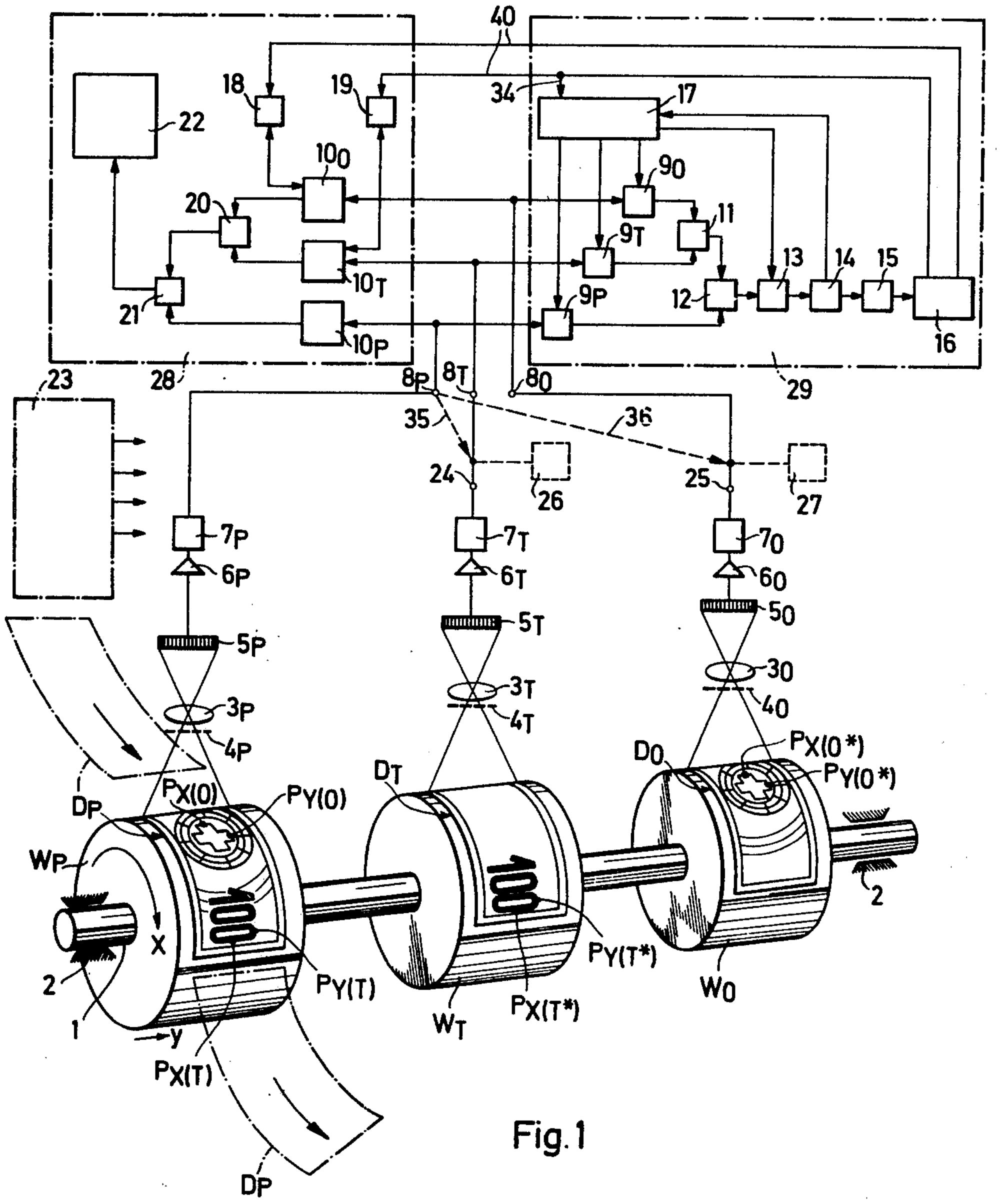
FIG. 1 is a block schematic diagram of one embodiment of apparatus according to the invention.

The apparatus illustrated in FIG. 1 is intended for printed products having text applied by two different printing methods. For example, they may be banknotes, as illustrated, which have an offset printed text and an intaglio printed text. As already stated, two separate originals, each containing only the information required for each individual printing method, are used for printed products of this kind and the relative positions of the printed product under test are determined separately with respect to each original. Accordingly, the apparatus is provided with three identical scanning systems one for the sample under text $D_P$, one of the original $D_T$ bearing the intaglio printed text, and one for the original $D_O$ with the offset printed text. If the sample $D_P$ contains other information printed by different methods (e.g. letter-press) in addition to the intaglio and offset printed information, then a corresponding number of additional scanning systems would have to be provided for the additional originals.

The subscripts P, T, O to the reference numerals used in the drawings relate to the sample (P), the intaglio original (T) and the offset original (O), but for the sake of simplicity they are omitted hereinafter where there is no risk of confusion.

The scanning systems for the sample $D_P$ and the originals $D_T$ and $D_O$ each comprise a gripper drum W, the drums being fixed on a common shaft 1 mounted for rotation in bearings 2 and driven in the direction of arrow X via a motor (not shown), an imaging optical system 3 with an aperture diaphragm 4, photoelectric transducers 5, an amplifier 6 and an A/D converter 7.

The gripper drums are suction drums known per se, having suction slots recessed into their circumference and connected to a suction source (not shown). A particularly advantageous and convenient gripper drum of this type is described in German Patent Application P 255 2300.6, which corresponds to U.S. Pat. Appl. Ser. No. 729,152 of Oct. 4, 1976.

The photoelectric transducers are arrays of photodiodes comprising a plurality of single diodes disposed in a straight line. These photodiode arrays are arranged parallel to the drum axes and receive the light reflected from each generatrix of the prints fixed on the gripper drums. The illumination source for the prints has been omitted for the sake of clarity.

The positions of the scanning raster points, and hence the scanning raster, are fixed by the distances between the individual diodes of the arrays and by the speed of revolution of the gripper drums. A central control unit 23 ensures that each individual diode of the arrays is interrogated once during the rotation of the drums over a distance corresponding to the distance between two lines of the raster. The electrical signals produced by the individual photodiodes are fed to the amplifiers 6 and, after amplification, are digitalized in the analog/-digital converters 7. The reflectance values of the individual raster points of the prints being scanned then appear in sequence line by line on the raster at the outputs 8 of the A/D converters 7, in the form of electrical digital signals.

As shown in broken lines in FIG. 1, the individual scanning systems for the two originals $D_T$ and $D_O$ could be replaced by stores 26 and 27 having a number of storage spaces corresponding to the number of points in the scanning raster of the remaining scanning system for the sample. The two originals $D_T$ and $D_O$ would then have to be scanned, before the actual test is carried out, by means of the sample scanning system, and the resultant reflectance values stored in the stores 26 and 27, from which they could then be withdrawn for further processing.

The prints may be scanned not only to determine the brightness of the reflected light, but also to determine its colour composition. This would be somewhat more expensive, since a separate scanning system would be required for each colour. Theoretically, however, it would proceed in the same way as the monochrome scanning described here.

The reflectance values of the individual raster points of the samples and originals as detected by the three scanning systems are fed to a text comparator circuit 28 and also to a relative position measuring circuit 29. In the latter the relative positions of the corresponding points of the text on the sample and originals are determined and fed via lines 40 to a text comparator circuit 28, where the correlation of the points on the sample and the originals is corrected by reference to these relative positions and then the actual text comparison is carried out. Before these operations the light and dark level are balanced for the sample and for the original.

The circuit 29 comprises three gates $9_P$, $9_T$ and $9_O$, controlled by a control stage 17, a mixer stage 11, a subtraction stage 12, a summation stage 13 also controlled by control stage 17, a store 14, a position computer 15 and a position store 16.

Stage 17 controls the gates 9 so that only reflectance values of raster points associated in each case with specific zones of the raster can pass to the mixer stage 11 and subtraction stage 12. In the mixer stage 11 the reflectance values passed by the gates $9_T$ and $9_O$ are associated with one another so that the resulting mixed product is directly comparable with the reflectance values passed by the gate $9_P$. This allows for the fact that the originals each have only one text, while the sample contains two texts printed one on top of the other. The mixer stage 11 electronically simulates an original having two texts printed one on top of the other. The mixer stage 11 is, in practice a multiplication circuit. The reflectance values of the raster points of the originals as selected by the control stage 17 mixed in the mixer stage 11 are subtracted from the reflectance values of the corresponding raster points of the sample in the subtraction stage 12.

The resulting reflectance difference values are added separately by sign in the summation stage 13 over a given group of raster points in a raster zone. The resulting negative and positive totals are stored temporarily in a stage of the store 14. A series of position values $P_j$ is formed in the position computer 15 from the stored totals by interpolation and extrapolation and this series is loaded in the position store 16 from which it can be called therefrom via lines 40 for evaluation purposes, e.g. for reflectance value correction on text comparison. The block schematic diagram of an apparatus for these operations is shown in the top left-hand part of FIG. 1 and will be explained hereinafter.

Figure 13:
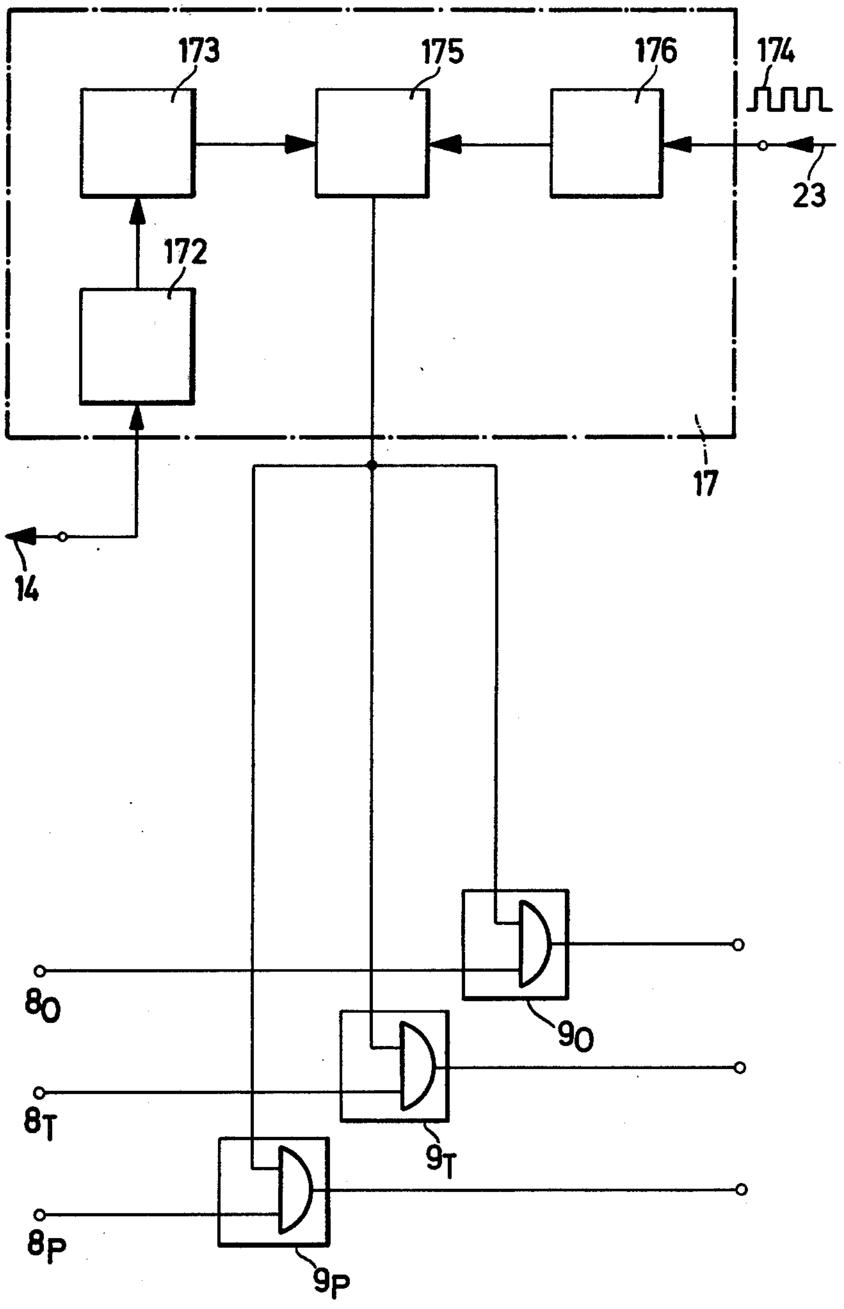

FIG. 13 shows a preferred embodiment of the control stage 17 in detail. The control stage 17 is substantially a correctable preselection counter and comprises a correctable preselection store 173, a comparator 175, a counter 176 and a raster zone displacement stage 172. The counting cadence 174 coinciding with the scanning cadence is fed from the central control unit 23. The serial numbers of all those raster points whose associated scanned reflectance values are to be processed further, are stored in the preselection store 173. As soon as the counter 176 reaches one of these stored numbers, the comparator 175 emits a pulse which opens the gate 9 for the associated raster point. The preselection store 173 is correctable, i.e., the serial numbers can be increased or reduced by specific amounts by the application of a suitable correction signal. Certain summation values selected from those stored in the store 14 are used to produce this correction signal by means of the raster zone displacement stage 172, as will be explained hereinafter.

Figure 11:
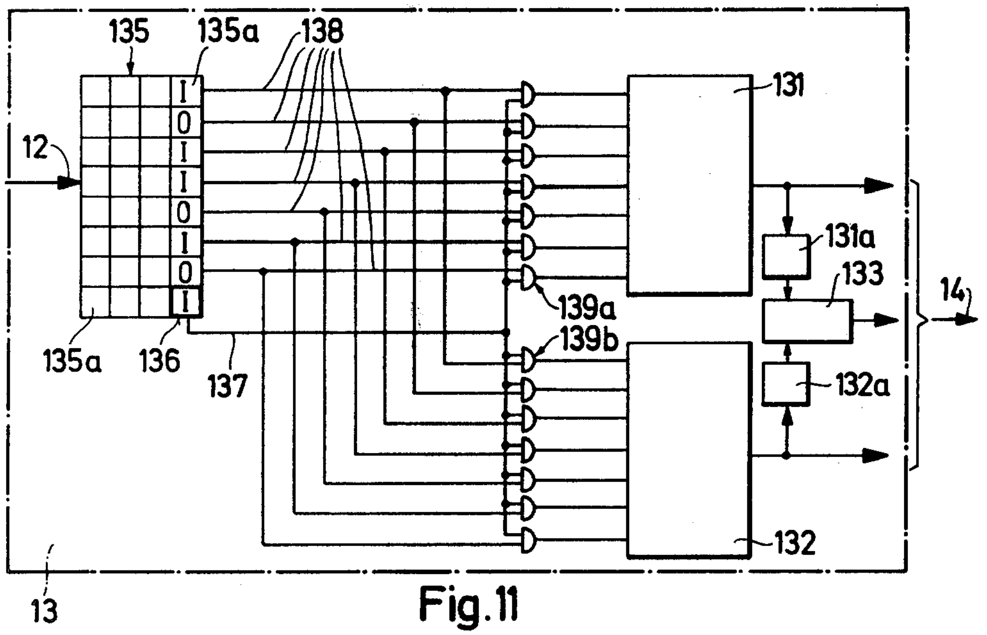
FIGS. 11 to 13 are block schematic diagrams of various details of FIG. 1.

FIG. 11 shows an embodiment of the summation stage 13 in greater detail. In comprises a shift register 135, two groups of gate circuits **139*a* and 139*b* each connected, via lines 137, 138, to an output of the shift register, two summation circuits 131, 132 each connected to one of the rate circuit groups, two threshold detectors 131*a* and 132*a* connected to the summation circuits, and a discriminator circuit 133** connected to the threshold detectors.

The reflectance differences arriving from the subtraction stage 12 pass to the shift register 135. For example, a reflectance difference indicated by the binary digit series 1011010 is shown in the stage furthest right of the stages of register 135. The eighth bit 136 forms a sign bit, "I" denoting positive and "0" denoting negative differential values. The information from shift register 135 passes via the gate circuits **139*a* or 139*b* to the summation circuit 131 or 132 depending upon which of the gate circuits is just opened by the sign bit 136. In this way, only the positive reflectance differences are added in the summation circuit 131, and only the negative in the summation circuit 132**.

The threshold detectors **131*a* and 132*a* emit a signal as soon as the summation values at the outputs of the summation circuits exceed a given threshold. The discriminator circuit 133 then determines at which of the threshold detectors this first occurred and produces at its output, for example, a logic "I" when the output signal of the threshold circuit 131*a* arrives earier, and a logic "0" when the output signal of the threshold circuit 131*a* arrives later than that of the other threshold circuit 132*a*. Together with the summation values formed in the summation circuits 131 and 132 this information now passes to the next store 14**. As will be explained hereinafter, the output information of the discriminator circuit indicates the direction of the relative positional distance between the sample and the original.

Figure 12:
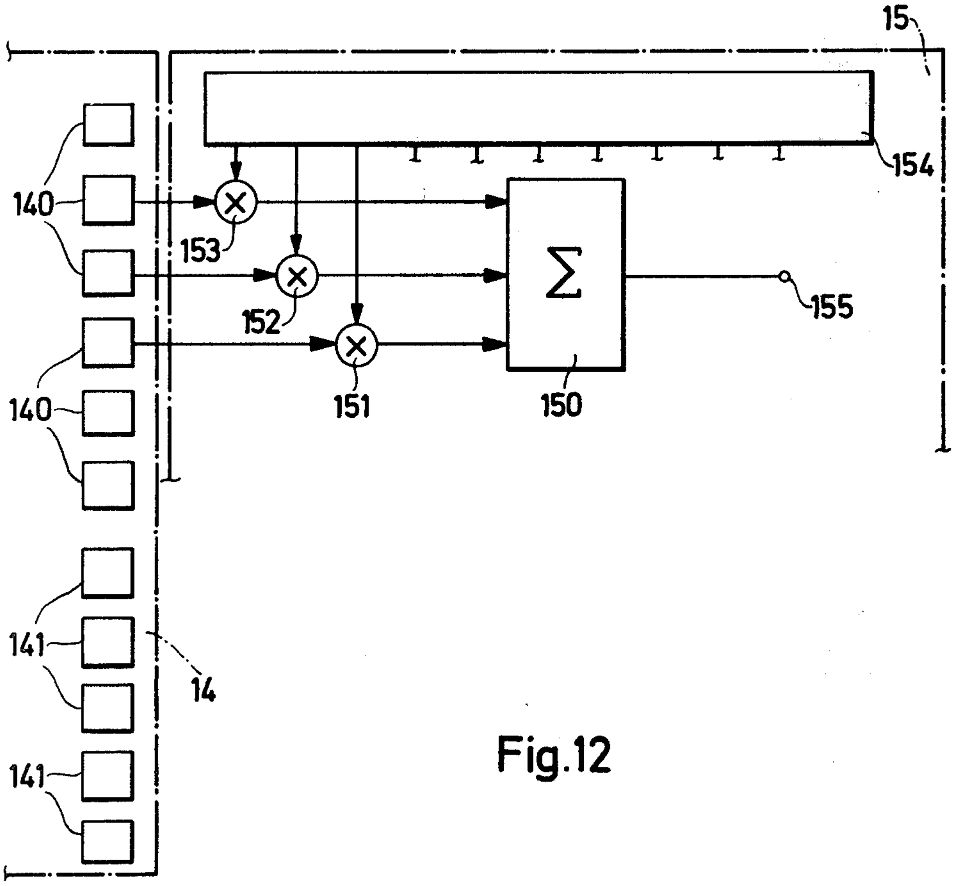

A block diagram of the position computer 15 is shown in FIG. 12. It comprises a constant value store 154 and a number of substantially identical computing circuits each having multipliers 151 to 153 and a summator 150, only one of such circuits being shown for the sake of simplicity. The number of computing circuits depends on the way in which the objects of comparison are divided up into sections, as will be described hereinafter. One input of each multiplier is connected to a storage place of the constant-value store 154 and another input to the storage places 140 and 141 of the store 14 connected in series with the position computer 15. The outputs of the multipliers are connected to the inputs of the associated summator. The outputs 155 of the individual summators 150 have position values $P_j$, which are related, via the equation $$P_j = \sum_i K_{ij} \cdot S_i,$$

to a specific number in each case of the sum values $S_i$ stored in the store 14, $K_{ij}$ denoting the multiplication constants stored in the constant-value store. The significance of these position values is explained hereinafter.

The text comparator circuit 28 comprises three intermediate stores $\mathbf{10}_P$, $\mathbf{10}_T$ and $\mathbf{10}_0$, two correlators 18 and 19 each connected to the position store via a line 40 and controlling the intermediate stores, a mixer stage 20, a subtraction stage 21 and an error computer 22.

The reflectance values of the sample and the originals pass from outputs 8 of A/D converter 7 to the intermediate stores 10, where they are provisionally stored. The reflectance values stored in the intermediate stores $\mathbf{10}^T$ and $\mathbf{10}_O$ are fed to the correlators 18 and 19 in accordance with the position values fed to them, and are associated in the mixer stage 20 in the same way as in the mixer stage 11 of the evaluation circuit 29. These associated original reflectance values are then subtracted in the subtraction stage 21, similarly to the subtraction stage 12, from the sample reflectance values which have also been fed from the intermediate store $\mathbf{10}_P$ after a predetermined delay. The resulting reflectance differential values are then evaluated in the error computer 22 in accordance with specific evaluation criteria. The individual functions are again controlled by the central control unit 23.

For a better understanding of the operation of the correlators 18 and 19 and of the intermediate stores $\mathbf{10}_T$ and $\mathbf{10}_O$, FIGS. **14*a* to 14*c* will first be explained. These each show a detail of the identical scanning rasters of the three scanning systems, FIG. 14*a* relating to the sample, FIG. 14*b* to the offset original and FIG. 14*c* to the intaglio original. The distance (K) between each two raster lines 41** is the same in both directions.

FIG. **14*a* shows a selected text point reference $P_P$. As a result of inaccuracy, for example, when the sample and the originals are fixed on the drums, the original text points corresponding to the sample text point $P_P$ will as a rule not coincide with the raster points $(P_P)$ of the original scanning raster, but will be at a varying distance therefrom $(\Delta X_{tot})_O$, $(\Delta Y_{tot})_O$, $(\Delta X_{tot})_T$, $(\Delta Y_{tot})_T$, e.g. at the intermediate points $(P_{\Delta X, \Delta Y})_O$ and $(P_{\Delta X, \Delta Y})_T$. As a rule, as illustrated, these intermediate points will not coincide with a raster point but be situated somewhere between four surrounding raster points $P_1$ . . . $P_4$. The distances between the intermediate points and the surrounding raster point $P_1$ nearest the points $(P_P)$ in each case have the references ΔX and ΔY. The original reflectance values at these intermediate points are now determined from the original reflectance values in the respective four surrounding raster points, preferably by linear interpolation. These interpolation values are then passed to the mixer stage 20 exactly when they arrive at the subtraction stage 21** together with the reflectance value of the sample point $P_P$ from the intermediate store $\mathbf{10}_P$.

FIGS. 15 and 16 show the intermediate stores $10_O$ and $10_T$ for the originals and the correlators 18 and 19 in greater detail. Each of the two intermediate stores comprises a random access write-in store (RAM) 101 and an interpolation computer 104. The two correlators each comprise a routing device 195, two quotient formers 182 and 183, four stores 184, 185, 186 and 187, and a control programmer 190. The quotient formers and the stores are combined in a quotient computer 196. The sample intermediate store $10_P$ contains in general only one RAM and is therefore not shown in detail.

The position values ΔX and ΔY (corresponding to $\Delta X_{tot}$ and $\Delta Y_{tot}$ in FIGS. 14*b* and 14*c*) determined in the measuring circuit 29 and fed to the correlators 18 and 19 via the leads 40 pass to the input 197 of the routing device 195 (FIG. 16). This passes the ΔX values to the quotient former 182 and the ΔY values to the quotient former 183.

In these, the position values are divided by the raster distance K. The whole quotient values (whole numbers) are then fed to the stores 184 and 186, any remainders (proper fractions) are fed to the stores 185 and 187. The whole quotient values correspond to the distances $(\Delta X_{tot} - \Delta X)$ and $(\Delta_{tot} - \Delta Y)$ between the points $(P_P)$ and $P_1$ in FIGS. 14*b* and 14*c*, the remainders corresponding to the distances ΔX and ΔY between $P_1$ and the intermediate points $P_{(\Delta X, \Delta Y)}$. The whole quotient values are then passed via lines 193 and 194 to the control programmer which, according to these values, generates a selection timing pulse from the control timing pulse fed to it via lines 191 from the central control unit 23. The selection timing pulse on output 192 of the control programmer is fed via a line 106 to the RAM 101 of the intermediate store 10 (FIG. 15) respectively connected to the correlator. The remainders from the stores 185 and 187 pass via lines 188 and 189 to the inputs 107 and 108 of the interpolation computer 104 of the associated intermediate store.

The reflectance values arriving from the outputs 8 of the A/D converters 7 are stored in the RAM's of the three intermediate stores. The control timing pulse fed via lines 102 to each RAM from the central control unit ensures that reflectance values from raster points with the same serial number are stored in all three RAM's under the same address in each case.

From the RAM's 101 of the two intermediate stores $10_O$ and $10_T$, the reflectance values then pass via transfer lines 109 simultaneously from each four adjacent raster points to the associated interpolation computers 104. Selection of the four raster points is effected by the selection timing pulses produced by the control programmers 190. The interpolation computers 104 now determine the reflectance values of the intermediate points defined by the ΔX and ΔY values at the inputs 107 and 108 and pass these to the mixer stage 20 via the outputs 105. At the same time, the reflectance values of the sample raster points corresponding to the respective intermediate points are called from the RAM of the sample intermediate store $10_P$.

The interpolation itself is advantageously linear and is preferably effected in discrete steps by appropriate division of the raster distance K. The procedure may be such that two interpolation values are first formed between each pair of raster points on each raster line and then another interpolation process is carried out to determine the definitive reflectance value of the intermediate points from these interpolation values. Of course other interpolation processes are also possible.

The determination of the relative positions of corresponding points of the text of the sample and the originals as carried out in the measuring circuit 29 will be explained in detail below.

As already stated hereinbefore, determination of the relative positions between the sample $D_P$ and the originals $D_T$ and $D_O$ by means of common orientation of the text edges, is inadequate. According to a method in accordance with this invention, therefore, a plurality of selected small positioning text zones distributed over the entire text area are used for the measurement. The relative positions of corresponding zones of the sample and the original are determined and the relative positions of the individual text points are determined therefrom by calculation. Preferably, however, the relative position of corresponding text points is not computed individually; instead, the text area is divided up into individual sections and in an approximation sufficient in practice it is assumed that text points within corresponding sections have identical relative positions, so that only the relative positions of the individual corresponding sections need to be determined.

Figure 10:
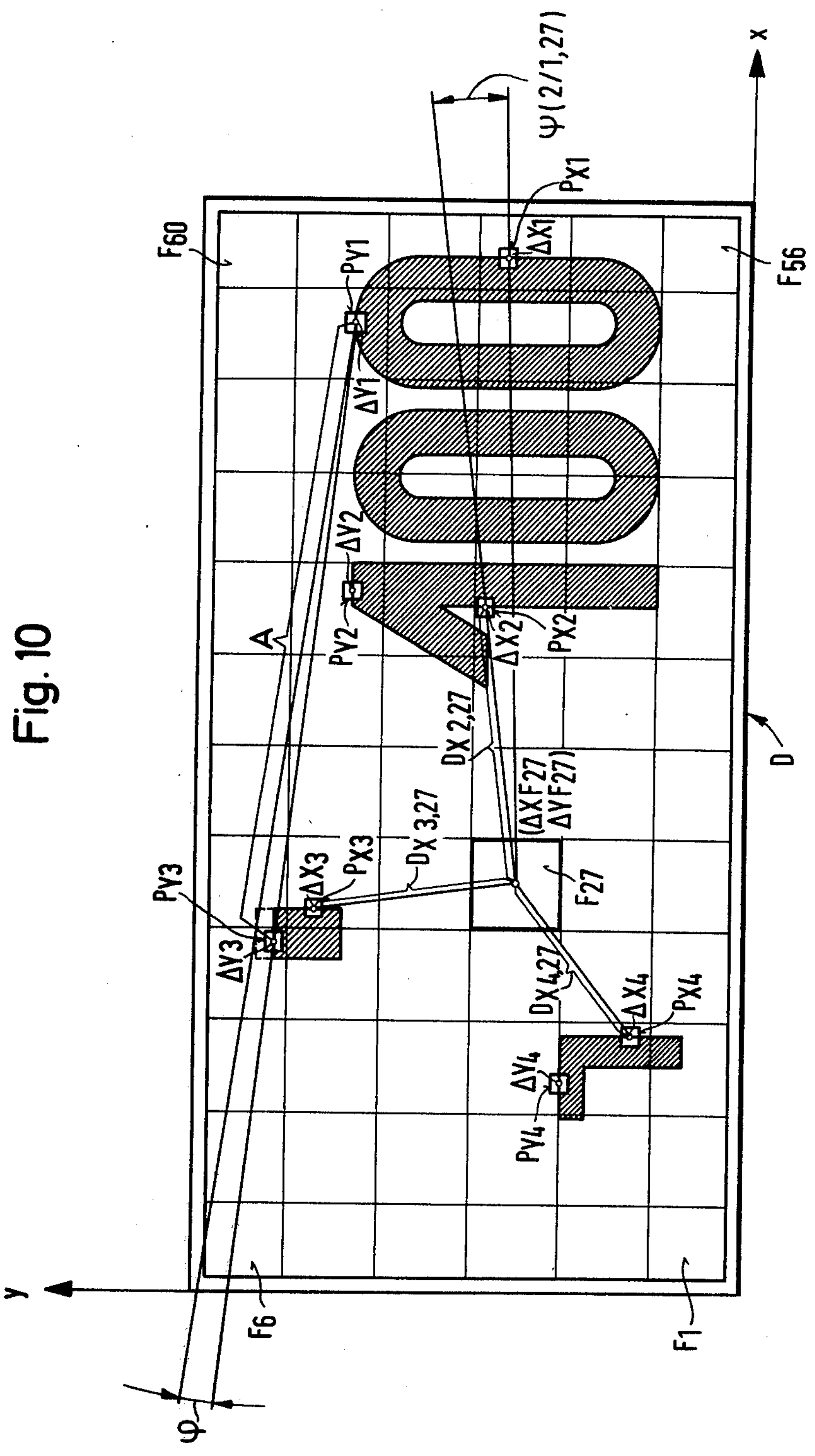
FIG. 10 illustrates a stylized banknote on which is superimposed raster zones and the division into sections.

FIG. 10 is an example of the division into sections and the distribution and arrangement of positioning text zones. The printed text D is divided up into 60 sections $F_1 \ldots F_{60}$. Eight positioning text zones $P_{X1} \ldots P_{X4}$, $P_{Y1} \ldots P_{Y4}$ are distributed over its surface. The selection or arrangement of these positioning text zones is such that they each comprise text portions having highly contrasting text edges, the text edges in the $P_X$ zones being at right angles to those in the $P_X$ zones. In addition, the text edges should, as far as possible, extend in the axial or in the circumferential direction of the gripper drums. The advantages of such a positioning text zone selection will immediately be apparent from the following.

A further criterion for selection of the positioning text zones lies in the differences between the contents of the individual originals. Referring to FIG. 1, the positioning text zones are so selected, for example, that some of them fall on those parts of the text where sample $D_P$ contains only information from one or other printing process, but not from both printing processes simultaneously. For example, the positioning text zones $P_{X(T)}$ and $P_{Y(T)}$ of the sample fall only on a portion of the text applied by the intaglio process, as will be immediately apparent from the offset original $D_O$, which contains no information at the corresponding places. Similarly, the positioning text zones $P_{X(O)}$ and $P_{Y(O)}$ fall on purely offset-printed portions of the text. For measurement of the text zone relative positions, of course, the corresponding original positioning text zones $P_X^*{}_{(T)}$, $P_Y^*{}_{(T)}$, and $P_X^*{}_{(O)}$, $P_Y^*{}_{(O)}$ on the associated originals $D_T$ and $D_O$ must be used.

For an understanding of the following it must be remembered that the concept of a positioning text zone relates to the text, i.e., designates a specific section of the text area of the sample or original. Against this, raster zones, which term is hereinafter used to designate groups of raster points of the scanning raster, is related to the scanning raster and is in effect stationary. In other words, corresponding raster zones of the different scanning systems contain raster points with exactly the same serial numbers.

The relative position of two associated positioning text zones on the sample and the original is now determined by selecting and thus fixing an appropriate raster zone to coincide with the positioning zone on the original, and then determining for the sample and the original the reflectance values in the individual raster points of this raster zone which is fixed for all the scanning systems, and comparing them with one another. If the sample is not identically aligned with the original at every point of the text in respect of the scanning rasters, the sample positioning text zone will not coincide with the stationary raster zone and the reflectance values in the raster points of the sample will therefore not coincide with those of the original. The degree of coincidence is then evaluated, as described hereinafter, for determination of the relative position.

Selection of the raster zones and hence of the positioning text zones is effected electronically, in control stage 17 by appropriate programming of the preselection store 173.

Figure 2:
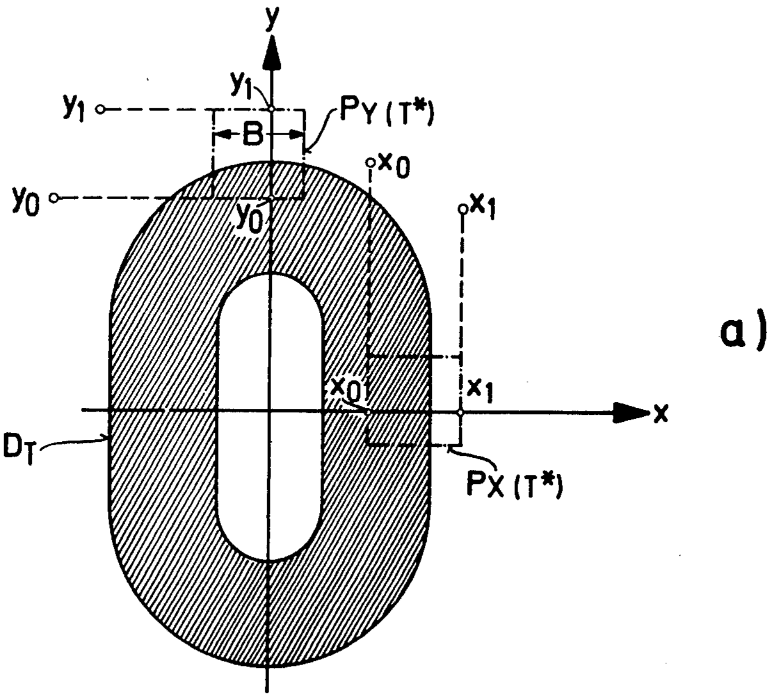
FIG. 2 shows details of FIG. 1 to an enlarged scale.
Figure 2:
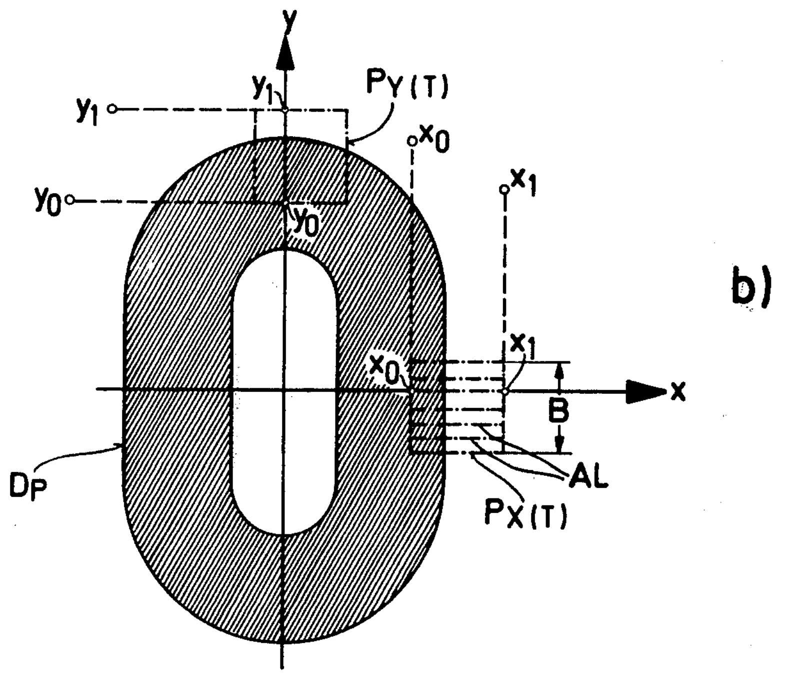
Figure 3:
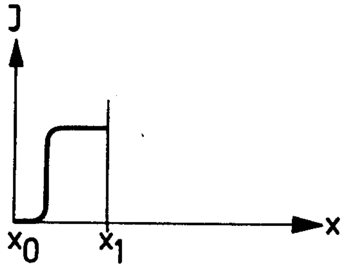
Figure 3:
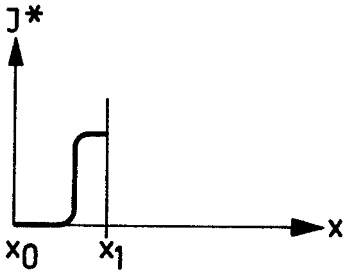
Figure 3:
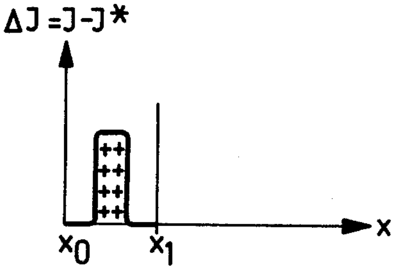

FIG. 2 shows a detail of the text of the sample $D_T$ and the intaglio original $D_T$ on an enlarged scale. The chain-dotted squares denote the position of the raster zones in relation to the text detail on the sample and the original. FIG. 3*a* shows the reflectance curve I in raster zone $P_{X(T)}$ of the sample on one line of scan in the X-direction (peripheral direction of the gripper drum) from $X_0$ to $X_1$. FIG. 3*b* shows the reflectance curve I along the same raster line in the case of the original. FIG. 3*c* is the curve showing the difference ΔI of the reflectance values. The area under the difference curve ΔI is a measure of the relative position ΔX of the associated positioning text zones with respect to the X-direction. A positive area means that the original is shifted in the plus-X direction as compared with the sample or the original positioning text zone under investigation in comparison with the corresponding positioning text zone on the sample.

In practice, of course, it is not just a single raster line, but the entire raster zone, that is scanned. Averaging over the individual scanning lines can then be carried out to compensate, for example, for the influence of any printing irregularities.

Figure 4:
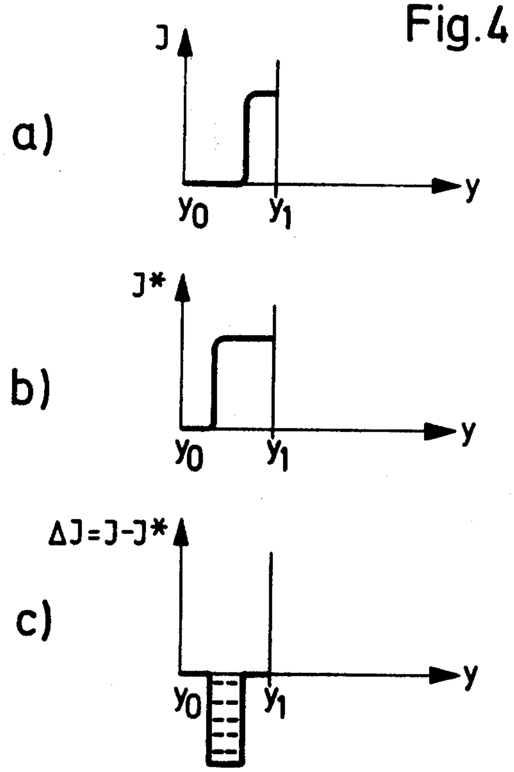

FIGS. 4*a* and 4*b* show the reflectance curves I and I* on scanning of the raster zones $P_{Y(T)}$ and $P_{Y^*(T)}$ in the Y-direction (parallel to the gripper drum axis) along the same raster line from $Y_0$ to $Y_1$. FIG. 4*c* shows the curve for the reflectance difference $\Delta I = I - I^*$. The area of the reflectance curve is a measure of the relative position ΔY of the associated positioning text zones with respect to the Y-direction. The negative area in this case means that the original is shifted in the minus-Y direction as compared with the sample in the positioning text zone under investigation.

Figure 5:
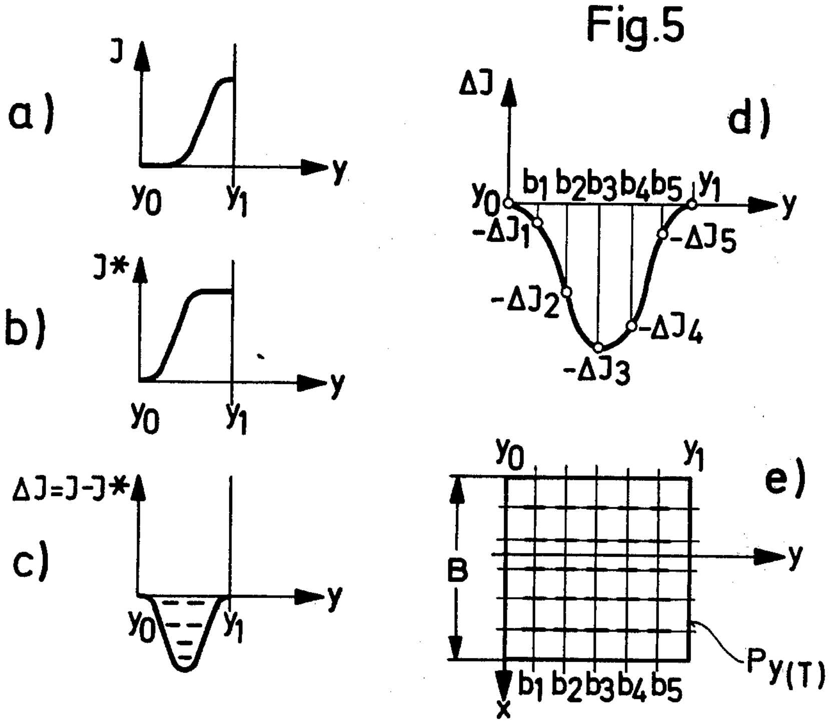

For the reasons explained hereinafter, it has been found advantageous to make the imaging of the printed texts on the photo-diode arrays somewhat unsharp. The reflectance curves are smoothed by the introduction of unsharpness. The reflectance curves given in FIGS. 4*a*-4*c* are shown in FIGS. 5*a* to 5*c* in the case of unsharp imaging as an example.

The continuous reflectance curves shown in FIGS. 3*a* to 5*c* are ideal curves which would result from continuous scanning. The curves actually consist of discrete steps which result from scanning in discrete raster points.

In FIG. 5*d*, which shows the same reflectance difference curve as FIG. 5*c* but to an enlarged scale, the discrete raster points $b_1 \ldots b_5$ are plotted with their discrete reflectance difference values $\Delta I_1 \ldots \Delta I_5$. FIG. 5*e* shows a raster zone $P_{Y(T)}$ with raster points marked by minus signs.

As already stated, the areas of the reflectance difference curves form a measure of the relative positions ΔX and ΔY. These areas can now readily be determined by summation of the discrete reflectance-value differences along a raster line (within the raster zone concerned). The sum is taken not just over a single raster line, but over all the raster lines or all the raster points of the zone in question. This sum value $S_i$ is, of course, also a measure of the relative position of the associated positioning text zone, but without any random influence and is therefore more reliable.

Figure 6:
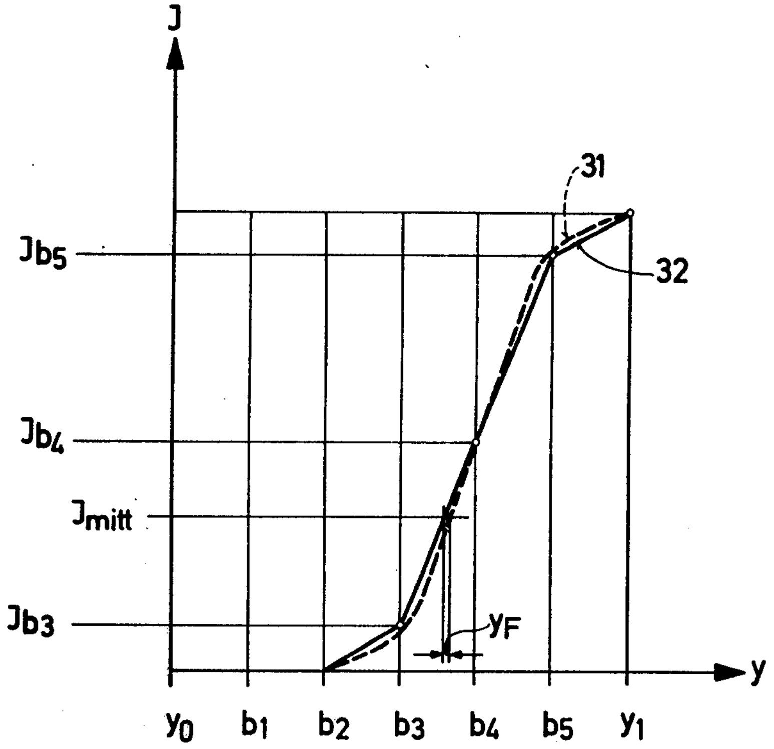

FIG. 6 shows a reflectance curve similar to FIG. 5*a* with plotted raster points $Y_0$, $b_1 \ldots b_5$, $Y_1$. A continuous curve line 31 is shown in broken lines (corresponding to FIG. 5*a*), while a curve line 32 is shown in solid lines being made up of individual straight lines connecting each pair of discrete reflectance values $I_b$. It will readily be seen that the position error $Y_F$ at I mitt occurring in the case of discrete scanning and linear interpolation between two discrete reflectance values (instead of continuous scanning with a continuous curve) is negligible at the steep points of the reflectance curve relevant to the determination of the relative positions.

Figure 7:
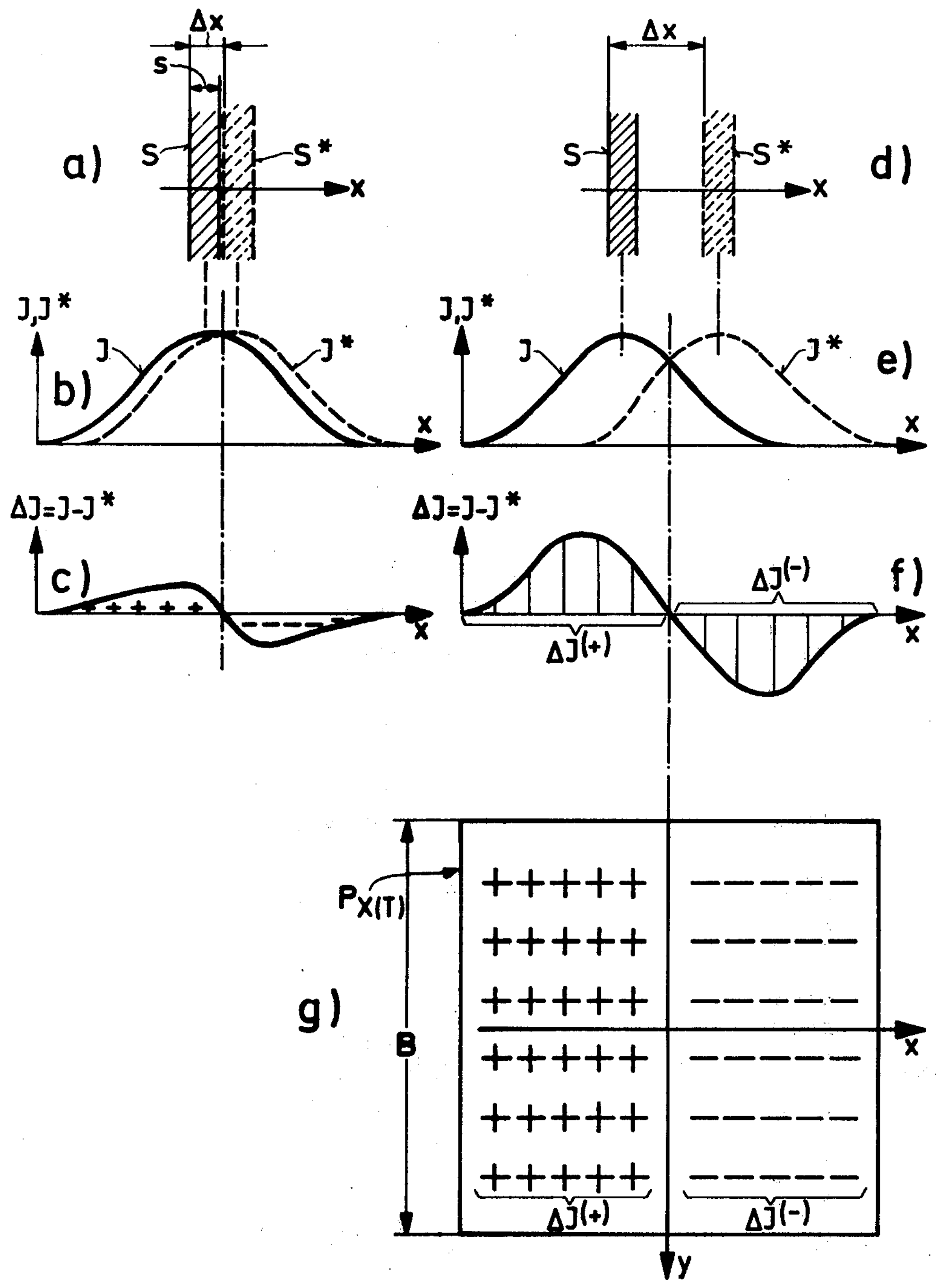

FIGS. 7*a* to 7*g* serve to explain the fact that the positioning text zones selected for determination need not necessarily always have a sharp text edge, i.e., two sharply contrasting substantially homogeneous zones with a relatively sharp boundary line, but that suitable positioning text zones may contain, for example, a line, i.e. a linear zone on a highly contrasting background zone. FIG. 7*a* shows the position of such a line S* on the original and a line S* on the sample with respect to the stationary scanning raster represented by the coordinate axis X. FIG. 7*d* shows the same lines but with a larger distance ΔX between them. FIGS. 7*b* and 7*e* show the curves of the reflectances I and I* for the line arrangements according to FIGS. 7*a* and 7*d*, and FIGS. 7*c* and 7*f* show the corresponding reflectance difference curves ΔI.

The main difference from the reflectance difference curves in the case of positioning text zones with text edges is that the reflectance difference values now occurring are not just of one sign, but of both signs. While the absolute value of the relative position ΔX is given solely by the sum of either the positive or negative reflectance differences extending over the entire raster zone area, the sign of the relative position depends on whether the positive or the negative reflectance differences first occur on scanning along a raster line. FIG. 7*g* shows a raster zone $P_{X(T)}$, in which those raster points in which positive reflectance differences occur in accordance with FIG. 7*f* are marked with a plus sign and the other raster points with a minus sign.

Evaluation of whichever sign first occurs with the reflectance differences effected in the summation stage shown in FIG. 11.

Figure 8:
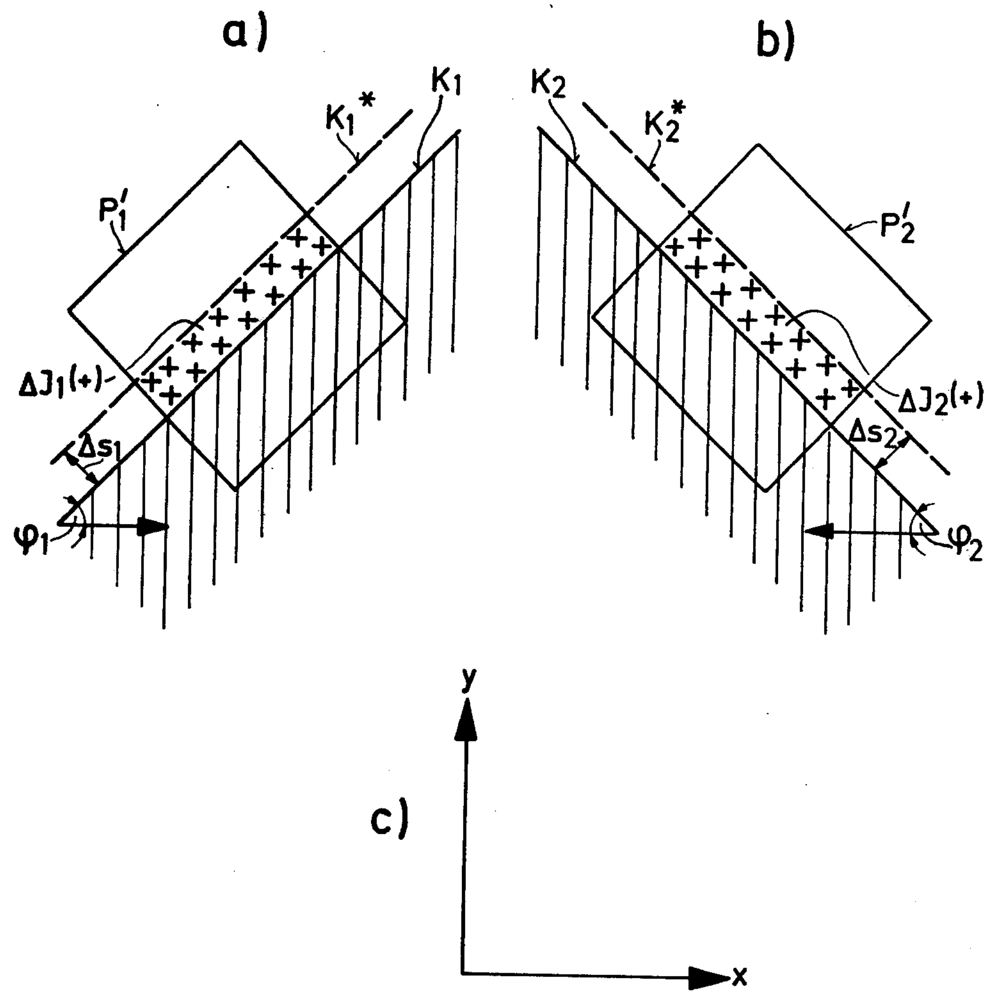

FIGS. 8*a* to 8*c* show that the text edges in the position text zones need not necessarily extend in parallel to the raster lines of the scanning raster (directions X and Y), but may also extend at an angle thereto. The two rectangular raster zones $P_1$ and $P_2$ in FIGS. 8*a* and 8*b* are also inclined at an angle to the coordinate X axes (FIG. 8*c*). The text edges in the sample and the original are denoted by $K_1$, $K_1^*$ and $K_2$, $K_2^*$ respectively. The sums of the reflectance value differences measured at the raster points marked + are then a measure of the distances $\Delta S_1$ and $\Delta S_2$ between the associated text edges. The relative positions ΔX and ΔY of the positioning text zones can then be determined easily from these distances by way of the (known) angles $\phi_1$ and $\phi_2$ of the text edges to the coordinate axes.

Figure 9:
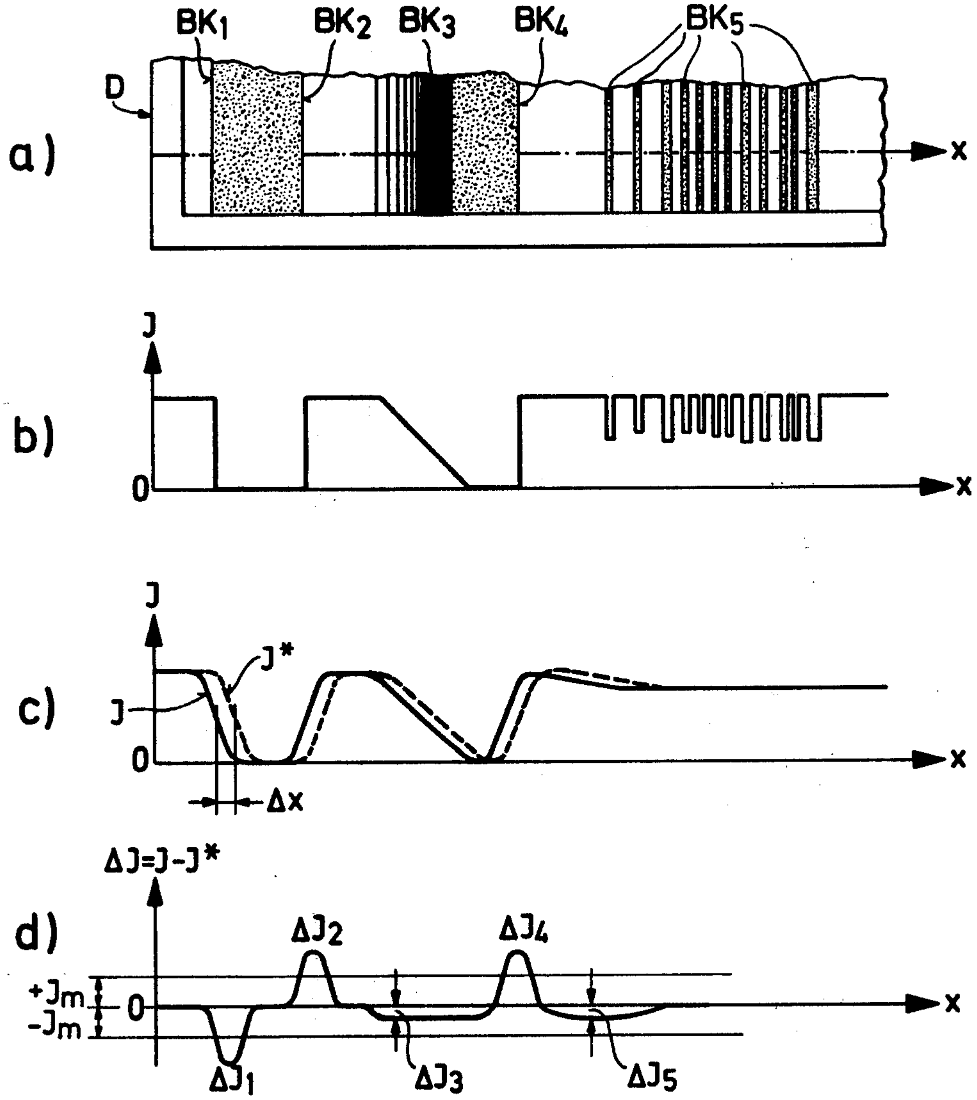
**FIGS. 9*a* to 9*d*** show reflectance curves to explain the low-pass filtering.

FIGS. 9a to 9d show the influence of different text information structures on the required accuracy in determining the relative positions of the associated text zone. FIG. 9a shows three text structures successively in the X-direction as are typical of banknotes. The first structure is an area of homogeneous density with two defining text edges BK1 and BK2. The second structure is made up of a fine line structure and a homogeneous area, the line structure having a density which increases in the X-direction. The boundary edges of the homogeneous area are denoted by BK3 and BK4. The third structure comprises a row of coarser lines BK5. FIG. 9b shows the reflectance curves associated with the individual text structures in the case of sharp imaging. In FIG. 9c, the solid line shows the reflectance curve of the same text structures with unsharp imaging. The broken line shows the reflectance curve of an identical text structure which is imagined to be displaced by ΔX. FIG. 9d shows the curve of the differences of the two reflectance curves I and I* in FIG. 9c. It will be clear that relatively considerable difference values ΔI occur only at those points of the text structures which contain sharp text edges. The relative positions must therefore be determined very accurately in these portions of the text even here very small displacements occurring between the sample and the original and not corrected by the relative position measurement can lead to faulty interpretation on comparing the sample with the original. Text portions having toned areas or coarser line structures are less suitable for determinining the relative positions. The relative positions need not be determined so accurately here, however, because in such portions of the text relatively small positional deviations are not so important.

Generally, it will be possible practically always to select the positioning text zones so that they contain text edges extending parallel to the raster lines. However, the denser zones of these positioning text zones will hardly ever be homogeneous or consist of just a line structure with tone lines parallel to the text edge. As a rule, the tone lines will extend at an angle to the text edge so that the latter does not appear sharp but frayed. These frayed text edges can, however, be made artificially sharper by controlling the defocussing of the edges when imaging them on the photodiode arrays. Of course an electronic low-pass filter system could be used instead of unsharp imaging.

Referring to the foregoing, therefore, a series of positioning text zones, i.e. at least two but preferably 10 to 20 per original, are selected and the relative position in relation to the corresponding zone on the original is determined for each individual zone. As already stated, the sum values $S_i$ of the reflectance differences formed for each raster zone associated with a positioning text zone are then a measure of the relative positions ΔX and ΔY. On the basis of the special selection of the positioning text zones with text lines or text edges parallel to the raster lines, only the relative positions ΔX are present for certaining positioning text zones and only the relative positions ΔY for others. The former have the references $P_{X1} \ldots P_{X4}$ and the latter $P_{Y1} \ldots P_{Y4}$, as shown in FIG. 10.

Because of their selection criteria, the positioning text zones are generally distributed fairly irregularly over the text area. For comparing the sample with the originals, however, the relative positions of all the text portions must be available. Consequently, the print is now divided up as shown in FIG. 10 into, for example, genuinely equal sections, and the relative position (ΔX,ΔY) of the individual sections is calculated by interpolation and extrapolation from the relative positions of the positioning text zones nearest each section. Taking index j as the number of a section and the index i as the number of a sum value or a relative position ΔX or ΔY of a positioning text zone, the relative positions $\Delta X_{F_j}$ and $\Delta Y_{F_j}$ of the section $F_j$ are calculated in accordance with the following formulae:

$$\Delta X_{F_j} = \sum_i K_{X_{i,j}} \cdot \Delta X_i$$

$$\Delta Y_{F_j} = \sum_i K_{Y_{i,j}} \cdot \Delta Y_i$$

In these formulae, $K_{X_{i,j}}$ and $K_{Y_{i,j}}$ denote empirically determined interpolation constants depending essentially on the distance $D_{X_{i,j}}$ and $D_{Y_{i,j}}$ (FIG. 10) between the positioning zone of number i and the centre of the section of number j. The indices X and Y relate only to the allocation of the constants K to ΔX-positioning text zones or to ΔY-positioning text zones. Depending on the positions of the sections j the sums extend, for different values of j, over the same or over different i-values. For the section No. 27 shown in FIG. 10 the above formulae explicitly read as follows:

$$\Delta X_{F_{27}} = K_{X_{4.27}} \cdot \Delta X_4 + K_{X_{3.27}} \cdot \Delta X_3 + K_{X_{2.27}} \cdot \Delta X_2$$

$$\Delta Y_{F_{27}} = K_{Y_{4.27}} \cdot \Delta Y_4 + K_{Y_{3.27}} \cdot \Delta Y_3 + K_{Y_{2.27}} \cdot \Delta Y_3$$

These calculations are carried out in the position computer 15 already described. The contents K are stored in the constant store 154.

The following approximation formulae may also be used to fix the constants $K_{X_{i,j}}$ and $K_{Y_{i,j}}$:

$$K_{i,j} : K_{i+1,j} : K_{1+2,j} = \frac{1}{D^c_{i,j}} : \frac{1}{D^c_{i+1,j}} : \frac{1}{D^c_{i+2,j}}$$

where c is an empirical constant which may, for example, be 1. The formula is valid both for $K_{X_{i,j}}$ and also $K_{Y_{i,j}}$; the indices X and Y have therefore been omitted. The following conditions should also be satisfied:

$$0 < K_{X_{i,j}} < 1 \,;\, 0 < K_{Y_{i,j}} < 1$$

$$\sum_i K_{X_{i,j}} = 1 \quad \sum_i K_{Y_{i,j}} = 1$$

In some cases it may be necessary to use not only the nearest positioning zones for calculation of the relative positions of the individual sections, but also positioning zones situated farther away, e.g. the zone $P_{X_1}$ (with the relative position $\Delta X_1$) for the section $F_{27}$ in FIG. 10. Since the positioning text zones farther away are to some extent screened by the nearer zones, their influence must be proportionally reduced, and this can be done, for example, by multiplying the associated expression $K_{i,j} \cdot \Delta X_k$ by a screening factor sin $\phi_{k,i,j}$, where the latter denotes the angle at which the distance between the screened positioning text zone $P_K$ and the screening positioning text zone $P_i$ appears from the centre of the section $F_k$.

Up till now only translatory relative displacements between the sample and the originals have been taken into account. Of course rotational displacement can also be included in calcuating the relative positions of the corresponding sections. To this end, preferably, two positioning text zones situated as far apart as possible, e.g. $P_{Y1}$ and $P_{Y3}$ in FIG. 10, are selected and the angular displacement of the entire original from the sample is determined from their relative position difference (e.g. $\Delta Y_3 - \Delta Y_1$) by division by the distance between them.

In FIG. 1, only text information of a single printing method (only intaglio or only offset printing) was present in the selected positioning text zones. This is the optimum case, since with this system the independent relative position determination is not disturbed by the other type of print. The mixer stage 11 in such cases operates rather as an OR gate, since text information comes either only from the offset original or only from the intaglio original. However, it may be necessary to use positioning text zones in which information from both printing method is present, e.g. a pronounced text edge from one printing method and a less pronounced line or tone structure from the other printing method. In that case, the mixer stage 11 acts as a superimposition print computer which from the individual reflectance values of the intaglio and offset originals calculates the combined reflectance values which should correspond to those of the sample containing both prints. The resulting abrupt changes in reflectance at edges of the text, for example, after the mixer stage will be equal to those of the sample, so that the correct differential values can be formed in the subtraction stage.

As already described, selection of the raster zones and hence of the positioning text zones required for determining the relative positions of corresponding zones in the sample and originals, is effected by appropriate programming of correctable preselection store 173. Since the relative positions to be determined may be in a fairly large range, the positioning text zones must be selected to be relatively large to ensure that the subsequent processing produces a reliable result. However, the larger the positioning text zones are made, the less the expected accuracy and the longer the computing time required. To keep the positioning text zones as small in area as possible, their position is corrected by reference to a rough position mearurement. To do this the relative positions, ΔX, ΔY of specific selected position text zones are measured and supplied as correction values to the correctable preselection store. The other positioning text zones or raster zones are then corrected according to these selected relative positions. Selection of the relative position values or positioning text zones used for this correction is effected by the raster zone displacement stage 172 which has already been mentioned hereinbefore and which is suitably programmed. Of course, these raster zones or positioning text zones used for correction are so disposed that their scanning is complete before scanning the other positioning text zones.

It is also advantageous so to select the positioning text zones or raster zones that no raster point of a zone is situated in the same raster line (Y-direction) as a raster point of any other zone. The circuitry is thus simplified considerably for the summation of the reflectance differences, which is carried out separately for each raster zone.

Some of the problems associated with the actual scanning itself will be explained in detail hereinafter.

As already stated, the relative positions between the points of the sample and the originals will only rarely be exactly equal to a multiple of the raster distance K and will usually be fractions thereof, so that the original reflectance values used for the text comparison must in each case be formed by interpolation from the reflectance values of the raster points adjacent the text points in question. To minimise computer outlay and hence circuitry, it is preferable to use linear interpolation. To ensure that the resulting interpolation error remains sufficiently small, however, certain conditions must be satisfied when scanning the text. This will be explained with reference to FIG. 17, which shows an example of a reflectance curve along a raster column (gripper drum circumferential direction X).

The continuous reflectance curve is formed from the discrete reflectance values at the individual raster points, of which the points $P_1 \ldots P_4$ are shown with their associated reflectance values $I_1 \ldots I_4$. The distance between the raster points is K. If the reflectance value $I_a$ of the intermediate point $P_a$ having a distance $\Delta X_a$ from the raster point $P_1$ is formed by linear interpolation from the two reflectance values $I_1$ and $I_2$, then this practically coincides with the actual reflectance value of the point $P_a$. The interpolation error is therefore negligibly small in the rising portion of the curve. The situation is however different at the top of the curve where the interpolated reflectance value $I_b^*$ of the intermediate point $P_b$ deviates perceptibly from the actual value $I_b$. In the example interpolation error is 10%. As will readily be seen, the maximum interpolation error will rise, with the given raster distance K, at the maximum frequency contained in the reflectance spectrum.

If therefore the interpolation error is to be kept small and the raster distance is not to be too small, care must be taken to ensure that the reflectance spectrum does not contain excessively high frequencies. In other words, the reflectance spectrum must be low-pass filtered. A reduction of the raster distance would be equivalent to increasing the number of raster points and hence would greatly increase computer outlay at least in respect of time. It has been found convenient in practice to select the critical frequency $f_G$ of the low-pass filtering system, i.e. the frequency whose amplitude is to be attenuated to half the amplitude of the frequency zero during filtering, so that the associated critical period length $T_G = 1/f_G$ is at least 4 to 5 times greater than the raster distance K. The reflectance curve shown in FIG. 17 represents a wave train cycle having the critical frequency $f_G$ where the condition $T_G = 5K$ is satisfied. Taking into account the fact that the amplitude is already attenuated to half at the critical frequency $f_G$, the maximum interpolation error of 10% is no longer important.

In practice, the raster distance K may, for example, be 0.2 mm and the critical cycle length $T_G$ may accordingly be 1 mm.

Low-pass filtering is to some extent already achieved by defocussing the images of the prints on the individual diodes of the photodiode array as mentioned hereinbefore. The individual photodiodes of the arrays are of course not ideally punctiform but square having side lengths K equal to the raster distance. The centrepoints of the photodiodes then define the raster points of the scanning raster. With sharp imaging, only light from a square point of the text having the dimensions K.K would reach each photodiode. As a result of defocussing the points of the text imaged on each photodiode are, however, increased in all directions by half the diameter $d_u$ of a circle of confusion. The individual photodiodes therefore receive light from a substantially square text spot having a side length ($K + d_u$). In these conditions the light radiating from the centre of the text spot has a greater effect on the photodiode than the light from peripheral zones of the text spot, so that with unsharp imaging there is a triangular transfer function (in either dimension X or Y) with the apex at the centre of the text spot. This transfer function, however, does not yet have the required low-pass effect, i.e., the proportions of the higher frequencies in the reflectance spectrum are still too high.

To obviate this, the aperture diaphragms 4 disposed in the paths of the scanning beams are specially constructed to have a transparency which decreases outwardly from the optical axis. The transparency curve is given in FIG. 19. The solid line $T_Y$ applies to the direction parallel to the drum axes (Y) while the broken line $T_X$ applies to the circumferential direction (X). R denotes the radius of the aperture diaphragms. The slight difference in the transparency curve for the two coordinate directions results in lines of the same transparency which are not circular but substantially elliptical. By means of this deviation from rotation symmetry it is possible to compensate for the influence of the continuous rotation of the drums. As shown in FIG. 18, a text point moves past the photo-diode in the direction X by an amount equivalent to the raster distance K on rotation of the drum during scanning. This results in a distortion of the transfer function in the X-direction, which with sharp imaging becomes triangular as does the transfer function when the image is defocussed and drum stationary. For linear interpolation, however, it is of extreme importance that the transfer function should be rotation-symmetrical. The asymmetry due to drum movement is now precisely compensated for by the asymmetrical transparency curve of the aperture diaphragms, so that finally the transfer function is rotation-symmetrical. The circle shown in FIG. 18 with the diameter T indicates the size of the text spot covered by a photo-diode, the size being dependent upon the special selection of the transfer function.

With the transparency curve shown in FIG. 19 of the aperture diaphragms 4 the resulting transfer function has the profile shown in FIG. 20. As will be seen from the Fourier transform of this transfer function shown in FIG. 21, text frequencies with cycle lengths equal to or greater than the text spot or base circle diameter T are attenuated by 50% or more.

FIG. 22 is a detail of a scanning raster having raster lines 41 and 42 and a raster distance K. Reference 5 denotes the text spot sharply imaged on a photodiode. The solid-line circle of diameter T denotes the text spot actually covered by the photo-diode as a result of defocussing. The broken-line circles define two adjacent text spots in the X-direction. The small cross-hatched area 43 denotes a printing fault.

FIG. 23 again shows the transfer function of FIG. 20. References $P_1 \ldots P_6$ denote points at different distances from the centre of the text spot. The evaluation factors $B_1 \ldots B_6$ denote the contributions made by the points $P_1 \ldots P_6$ to the reflectance value of the relevant text spot as determined by the photo-diode. Thus when the points $P_i$ of the text spot have the reflectance values $I_i \ldots$, the total reflectance value of the text spot is equal to the sum of the products of $I_i$ with the corresponding evaluation factors $B_i$ over the entire text spot. (The above-mentioned points $P_i$ must not, of course, be confused with the raster points).

The mean text spot size $F_m$ is defined as that area having a diameter $I_m$ which, given homogeneous reflectance (density) over the entire area at constant maximum evaluation $B_m$, has the same effect on the photodiode as the total text spot with outwardly decreasing evaluation. This mean text spot size $F_m$ governs the sensitivity of the system to small-area printing faults. If, for example, a black error spot 43 (FIG. 22) of size $F_f$ is situated in a white section, the relative reflectance variation measured by the photo-diode due to the error spot is $F_F/F_m$. The percentage reflectance variation cannot be too small since the accuracy and resolution requirements of the scanning systems (photodiodes, amplifiers, and A/D converters) would be excessive. This means that there must be a lower limit to the smallest error spot detectable, i.e., ratio $F_F/F_m$ for a reasonable outlay for the scanning system; it is nevertheless still possible to detect fault or error spots down to about 0.05 $mm^2$.

FIG. 24 shows the transfer functions and evaluation curves of FIG. 22 for three text spots situated side by side. Their considerable overlap (T greater than 4K) ensures that each fault spot 43 — even if situated between the raster points — is reliably detected by one or other photo-diodes with a high evaluation factor $B\alpha$ or $B\beta$. If the mutual overlap of the evaluation curves were not so pronounced then the error spot might be taken into account only with a relatively small evaluation factor by all the photodiodes in question and thus might not be detected at all.

The error evaluation method carried out by the error computer 22 and according to which the samples are found to be "good" or "bad" will be explained below. The computer 22 is, in practice, any suitably programmed process computer or mini-computer.

FIGS. **25*a* and 25*b* each show to an enlarged-scale, detail of a sample banknote text and an original banknote text. It will be apparent that the sample clearly deviates from the original at three points having the references $F_1$ to $F_3$. The chain-dotted lines 41 and 42** extending parallel to the coordinate axes X and Y indicate the scanning raster with a raster distance K. Each two pairs of lines at right angles to one another define a text "point". Each text point thus has the area $K \times K$. The text points need not necessarily be square, of course, but may be circular for example. Overlapping text points are also possible.

FIGS. **25*d* and 25*e* show the reflectance values $I_P$ and $I_V$ in the form of arrows of varying length determined on scanning the sample and original along the coordinate axis K at the text points $X_1 \ldots X_{10}$, FIG. 25*d* relating to the sample and FIG. 25*e* to the original. FIG. 25*f*** shows the differential values $\Delta I$ of the reflectances in the corresponding original and sample points $X_1 \ldots X_{10}$. Positive differential values $\Delta I = I_V - I_P$ are denoted by upwardly directed arrows while negative values are denoted by downwardly directed arrows. The absolute amounts of the differential values are symbolized by the length of the arrows.

FIG. **25*c* whose 3-dimensional representation is simply to aid in understanding the following is a similar diagram to FIG. 25*f* showing the differential values $\Delta I$ for the individual text points of the banknote details shown in FIGS. 25*a* and 25*b*. Each text point has a differential value $\Delta I$ associated with it. The total of all the differential values for the entire banknote surface is designated hereinafter as the differential field. The individual values $\Delta I$ of the differential field are in actual fact stored in a suitable electronic store, e.g. a random access write-in store (RAM) in the error computer 22** in such a manner that the position of the text points associated with said values is also maintained on the banknote text.

FIG. 26a shows a line of the differential field parallel to the X-axis and is similar to FIG. 25f. The line contains the text points $X_1 \ldots X_{23}$ with the respective associated differential values $\Delta I$.

The first step in evaluating the differential values is to provide tone correction. To this end, the arithmetic mean $M_{\Delta I}$ of the differential values is formed for each text point from the text points of a given surrounding zone and the text point concerned is deducted from the differential value. The surrounding zone may, for example, be of a size of 0.5% to 10% of the total banknote area. Preferably, the area of the surrounding zone is about 2% to 5%. It has been possible to obtain good results, for example, with surrounding zones of $20 \times 20$ $mm^2$ in the case of a banknote having an area of about $100 \times 200$ $mm^2$. It would be possible — although somewhat less favourable — to select the surrounding zone to coincide with all the text points, i.e., so that it is equal to the total banknote area. Another possibility of tone correction would be to divide the banknote area into tone correction zones, find the mean of the differential values from each tone correction zone, and subtract these mean values from the differential values originating in each case from text points situated within such a zone.

The object of the tone correction is, in particular, to eliminate small and medium tone deviations between the sample and the original, for these acceptable tone deviations might disturb further evaluation of the differential values. Tone correction also creates the conditions for an advance error decision. As will be seen from FIG. 26a, a tone threshold TS is predetermined for the or each mean value. If one of the mean values exceeds this threshold TS, the sample is assessed as defective. If the tone threshold is exceeded it simply means that unacceptably large tone differences exist between the sample and the original in respect of density or colour. The magnitude of the tone threshold TS naturally depends on what is considered acceptable and what is considered unacceptable.

After tone correction, a minimum threshold correction is carried out in which all the (tone-corrected) differential values whose absolute values are below a predetermined minimum threshold MS are eliminated or made zero so that they are subsequently disregarded.

FIG. 26b shows the tone-corrected differential values $\Delta I - M_{\Delta I}$ at the text points $X_1 \ldots X_{23}$. Two minimum thresholds $\pm MS$ and $\pm MS_O$ are also shown. FIG. 26c shows the result of the minimum threshold correction. Only those differential values $\Delta I^* = \Delta I - M_{\Delta I}$ whose absolute value is greater than that of the minimum thresholds MS and $MS_O$ now remain.

The object of eliminating small differential values is to avoid them interfering with the further evaluation required to determine small-area errors. Differential values below the minimum threshold MS are not necessary for this purpose. If a small-area error of large contrast (usually equal to about 1 density unit in printed products) and having the area $F_F$ is just to be detected, then the error sensitivity must be $F_F/F_m$, where $F_m$ denotes the area of a text point ($K \times K$). If $F_F/F_m$ is, for example, 10%, a high-contrast small error which is just to be detected gives a percentage reflectance variation of $\Delta I_F/I_{max} = 10\%$ in the text point, where $\Delta I_F$ denotes the reflectance differential value as a result of the error and $I_{max}$ the maximum reflectance values of the text point. The required sensitivity for complete differential value evaluation can thus be adjusted by suitably adjusting the minimum threshold MS, i.e. in accordance with $MS/I_{max} = F_F/F_m$. Faults or errors giving a smaller relative reflectance variation than $\Delta I_F/I_{max} = MS/I_{max}$ are disregarded. The minimum threshold MS need not be constant for the total sample area or the total differential field, its size may vary in dependence on location. The differences between the sample and the original may be much greater at certain places on the banknote, e.g. in place where the watermark appears which has been found to be very inaccurate. If such differences are regarded as acceptable then the minimum threshold can be made higher for those portions of the text than for other portions so that no fault or error indication is produced. FIG. 26b shows a local high minimum threshold having the reference $MS_O$. It has been found in practice that it is satisfactory to make the minimum threshold MS substantially equal to the tone threshold TS, apart from local exceptions. Of course the minimum threshold MS and the tone threshold TS may be selected to be the same or different for each colour if colour scanning is carried out.

After tone and minimum threshold correction there only remain differential values $\Delta I^*$ of a certain minimum size in the differential field (FIG. 26c). If the fault or error decision were made only according to whether any one of these differential values $\Delta I^*$ exceeds a given amount, such decision would be false. A single small fault dot of medium contrast, for example, must not be assessed as a fault or error although an accumulation of a number of such dots situated more or less close to one another should be so assessed, because such accumulations appear to the human eye as a fault or error. It has been found in practice that the eye usually perceives a fault or error when the products of density variation $\Delta D$ due to a disturbance and area $F_F$ of a more or less coherent disturbance is greater than 0.1 $mm^2$. High-contrast disturbances ($\Delta D = 1$) are thus perceived as an error or fault even when small in size (as from 0.1 $mm^2$). The geometric shape of the disturbance or fault or error plays only a secondary part in such cases. These empirical facts are taken into account during further evaluation.

Thus the differential values of each text point (such as still remain after the tone and minimum threshold correction) are added with predetermined weighting and with the correct sign to the differential values of the adjacent text points. Figuratively speaking, "fault hills" having the height of the differential value in each case are allocated to the individual differential values and then the individual fault hills are superimposed to form a "fault mountain" extending over the entire differential field.

FIG. 29a shows an example of a "fault hill" which is conical and its height is equal to the (corrected) differential value $\Delta I^*$ of the text point $X_3$. The diameter of its base is six times the distance between two text points. The superfices of the fault hill indicates the weight with which the differential value $\Delta I^*$ of the text point $X_3$ is added to the differential values of its surrounding points (e.g. $X_0$, $X_1$, $X_2$, $X_4$, $X_5$, $X_6$). The size of the base area determines the breadth effect. The fault hill is therefore simply a three-dimensional representation of a weight function dependent upon the two coordinates X and Y.

FIG. 27 is a section of the corrected differential values $\Delta I^*$ of the fault hills associated with the individual text points $X_1 \ldots X_{23}$. The contour lines of the fault hills have been given the reference 44. Superimposition of the individual fault hills gives the fault mountain having the reference FG. The superimposition in respect of the text point $X_4$ is shown explicitly as an example. The height of the fault mountain at this text point is the sum of the heights $V_5$ and $V_6$ of the fault hills associated with the text points $X_5$ and $X_6$.

The breadth effect of the differential values $\Delta I^*$ will be clear. The height of the fault mountain is dependent not only on the magnitude of the differential values but also on whether there are other differential values in the surroundings. Thus both the contrast of the fault ($\Delta I$) and its area (number of text points) are jointly taken into account in the evaluation.

To form the fault decision there now needs to be just one predetermined fault threshold $\pm FS$ and investigation as to whether the fault mountain, i.e. the absolute amounts of the added differential values at each point of the text, does or does not exceed the fault threshold FS. If the fault threshold is exceeded the sample is evaluated as faulty. The magnitude of the fault threshold is determined empirically and depends on what is to be assessed as a fault or not.

Apart from the conical forms, any other forms of fault hills or weight functions are possible in principle. FIGS. 29*b* to 29*f* show a small selection. The fault hills may have rotation-symmetry or pyramid-symmetry or even be block-shaped. The base surfaces may have a diameter or side length of about 4 to 20, preferably 8 to 12, times the distance between two text points. This corresponds to a breadth effect on surrounding points up to the maximum distance of about 2 to 10 to 4 to 6 text point distances. The weight function may fall off linearly (FIG. 29*a*, 29*b*) or exponentially (FIG. 29*c*, 29*d*) or be constant over the entire base area (FIG. 29*e*, 29*f*).

FIGS. 28*a* to 28*c* show the influence of different fault hill forms on the shape of the resulting fault mountain for one and the same differential field, of which only one line is shown in each case with the text points $X_1 \ldots X_{16}$. FIG. 28*a* shows a fault mountain based on regularly pyramidal fault hills as shown in FIG. 29*b*. FIG. 28*b* is based on pyramidal fault hills with exponentially curved side surfaces as shown in FIG. 29*b*, and FIG. 28*c* is based on a fault mountain consisting of a superimposition of block-shaped fault hills as shown in FIG. 29*f*.

The block-shaped fault hill is the most favourable for practical performance of evaluation in the fault computer. However, with this form of fault hill the minimum threshold correction is absolutely necessary, because otherwise even relatively small errors would rapidly be summated to give sum values above the fault threshold, because of the considerable breadth effect.

Although the invention has been described above only in connection with the quality control of printed products, more particularly banknotes, the method according to the invention is applicable to other information supports, e.g. magnetic cards or the like.

What is claimed is:

1. A method for testing the print quality of a sample having a printed text, more particularly a bank note, the text content of which is made up of at least two partial text contents originating from different printing processes, comprising:

using a separate original having a partial text content originating from the particular printing process concerned for each printing process, determining the relative positions of the sample in respect of each original, combining the partial text contents of the individual originals in accordance with the partial text contents printed one above the other on the sample to form a total original text content, thereby taking into account said relative positions, comparing the contents of the sample with the total original text content, and assessing the sample by reference to the result of this comparison.

2. A method according to claim 1, comprising photoelectrically scanning the sample and the originals with identical scanning rasters to produce reflectance values, combining reflectance values from the originals by logic operations to combine and the partial text contents of said originals, and comparing the reflectance values having undergone said logic operations with reflectance values from the sample.

3. A method according to claim 2, comprising scanning the originals prior to scanning of the sample and storing reflectance values obtained on scanning the originals.

4. A method according to claim 2, comprising suppressing higher frequencies of the frequency spectrum contained in the reflectance values obtained on scanning by low-pass filtering.

5. A method according to claim 4, wherein low-pass filtering has a critical frequency $f_G$ and comprising selecting said critical frequency so that its cycle length $L_G = 1/f_G$ is at least 4 to 5 times greater than the distances K between each two adjacent raster points of the scanning raster.

6. A method according to claim 4, wherein the low-pass filtering is carried out by unsharp imaging of the sample and the originals on to photoelectric transducers used on scanning, and by the provision of an aperture diaphragm having outwardly decreasing transparency as considered from the optical axis in the path of the imaging rays.

7. A method according to claim 6, comprising selecting the degree of unsharpness and the transparency curve of the aperture diaphram are so that the photoelectric transducers receive light from a substantially circular text spot for each raster point and the contributions which the individual points of this text spot make to the total reflectance value produced by the transducers the respective raster points are at least approximately rotation-symmetrical with respect to the optical axis.

8. A method according to claim 7, wherein the circular text spot has a diameter T which is at least twice as large as the raster distances K.

9. A method according to claim 7, comprising scanning the sample and the originals by means of a plurality of photoelectric transducers disposed in a straight line and spaced by an amount equal to the raster distance K, whereby the sample and the originals are displaced substantially at right angles to said line relatively to the photoelectric transducers, and selecting the transparency curve of the aperture diaphragms to deviate from rotation-symmetry in such a manner that points equidistant from the diaphragm centre and situated on a diaphragm diameter parallel to the direction of relative displacement have a greater transparency than on a diameter at right angles thereto.

10. A method according to claim 2 comprising, if an original text point corresponding to a sample text point does not coincide with points of the scanning raster, taking into account their relative positions, forming the reflectance values of this original text point by interpolation from the reflectance values at four raster points in each case surrounding the original text point in question.

11. A method according to claim 2, comprising performing said the logic operation carried out on the reflectance values by multiplication of the reflectance values.

12. Apparatus for testing the print quality of a sample having a printed text, the text content of which is made up of at least two partial text contents originating from different printing processes, comprising a photoelectric scanning system operating pointwise for producing reflectance values from the sample and at least two separate originals at each individual scanning raster point, a relative position measuring circuit following the scanning device for determining the relative positions of corresponding text points of sample and original printed texts scanned in the scanning device, and a text comparator circuit which also follows the scanning device and which comprises two correlator stages which are connected to the scanning device and to the relative position measuring circuit and which correlate the reflectance values originating from corresponding text points on the original texts in accordance with the relative position values of these original printed texts determined by the relative position measuring circuit and the sample printed text and the corresponding text points of the sample printed text, and comprising a logic operation stage for subjecting associated reflectance values of the original printed texts to a logic combining operation, and a comparator stage for comparing the original reflectance values after being subjected to the logic operation, and the associated reflectance values of the sample printed text, and a fault computer following the comparator stage for evaluation of the results of the comparison.

13. Apparatus according to claim 12, wherein each correlator stage comprises a random access write-in store for the reflectance values of the individual scanning points and a read-out control controlled by the relative position measuring circuit to control the sequence of read-out per unit of time for the individual reflectance values according to the relative position values.

14. Apparatus according to claim 13, wherein the read-out control is so constructed that the stored reflectance values of four adjacent raster points are read out at any time.

15. Apparatus according to claim 14, further comprising an interpolation computer following the write-in store and forming an intermediate value from each four read-out reflectance values by linear interpolation according to the relative position values.

16. Apparatus according to claim 13 wherein the read-out control comprises a quotient computer connected to the relative position measuring circuit and a control programmer connected to the computer, the quotient computer has a quotient former which divides the relative position values fed to it by the relative position measuring circuit by a fixed value, and means which feed the whole-number quotient values occurring during the divisions to the control programmer and the remainders to the interpolation computer and the control programmer generates a selection timing pulse in accordance with the quotient values fed to it, such timing pulse determining the addresses of each four reflectance values to be read out of the store.

17. Apparatus according to claim 12 wherein the logic operation stage is a multiplication circuit.

18. Apparatus according to claim 12 wherein the scanning device comprises an imaging optical system adjusted to be unsharp, and an aperture diaphragm in the path of the imaging rays, said diaphragm having transparency decreasing outwardly from the optical axis.

19. Apparatus according to claim 12 wherein the scanning device has rectilinear photo-diode arrays as photoelectric transducers.

20. Apparatus according to claim 12 wherein the scanning device comprises rotatably driven suction drums as a support for the sample and the originals to be scanned.

21. A method for testing the print quality of a sample having a printed text, the text content of which is made up of at least two partial text contents originating from different printing processes, comprising:

providing a separate original having a partial text content originating from the particular printing process concerned for each printing process;

electronically pointwise scanning the originals in accordance with a raster which is stationary with respect to the originals;

selecting a plurality of individual positioning zones equally from the originals and the sample so that corresponding zones of the originals and the sample consist of corresponding image points and said zones are comparatively small with respect to the total area of the orignals and the sample;

fixing the sample with respect to a further scanning raster which has the same geometrical properties as said stationary scanning raster and electronically pointwise scanning the sample;

electronically processing scanning data obtained from scanning the originals and the sample so as to obtain first position data indicative of the relative position of said individual positionings zones of said sample, each with respect to an individual raster zone of said further scanning raster, each individual raster zone being defined by the raster points which correspond to those raster points of the stationary raster which coincide with the image points of the respective individual positioning zone of the originals;

interpolating and extrapolating the thusly obtained data so as to obtain second position data which are indicative of the relative position of the image points of the sample each with respect to an individual raster point of said further scanning raster, said individual raster points corresponding to those raster points of the stationary scanning raster which coincide with the respective image points of the originals;

combining the partial text contents of the individual originals in accordance with the partial text contents printed one above the other on the sample to form a total original text content, thereby taking into account said second position data;

comparing the contents of the sample with the total original text content; and assessing the sample by reference to the result of this comparison.

22. The method according to claim 21, further comprising equally dividing up the originals and the sample 30. Apparatus according to claim 28, wherein the selection stage includes a displacement stage which selects sum values associated with predetermined raster zones from the sum values formed by the summation stage and displaces the selected zones in the selection stage in relation to the scanning raster in accordance with the selected sum values.

31. Apparatus according to claim 13 wherein the relative position measuring circuit comprises:

a store having a plurality of stages for storing scanning values produced by scanning said originals;

a selection stage which from all the scanning values selects those which originate from corresponding raster points in corresponding raster zones of the sample and originals;

a subtraction circuit for forming the differences between the selected scanning values from the originals and the sample;

a summation stage controlled by the selection stage for forming the sum values of positive and negative scanning value differences separately according to sign for the raster points of each zone; and a position computer processing said sum values to obtain position values of corresponding image points of the samples and the original with respect to a stationary coordinate system.

* * * * *

UNITED STATES PATENT OFFICE
CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

Figures 14 through 29 should be added as shown on the attached sheets.

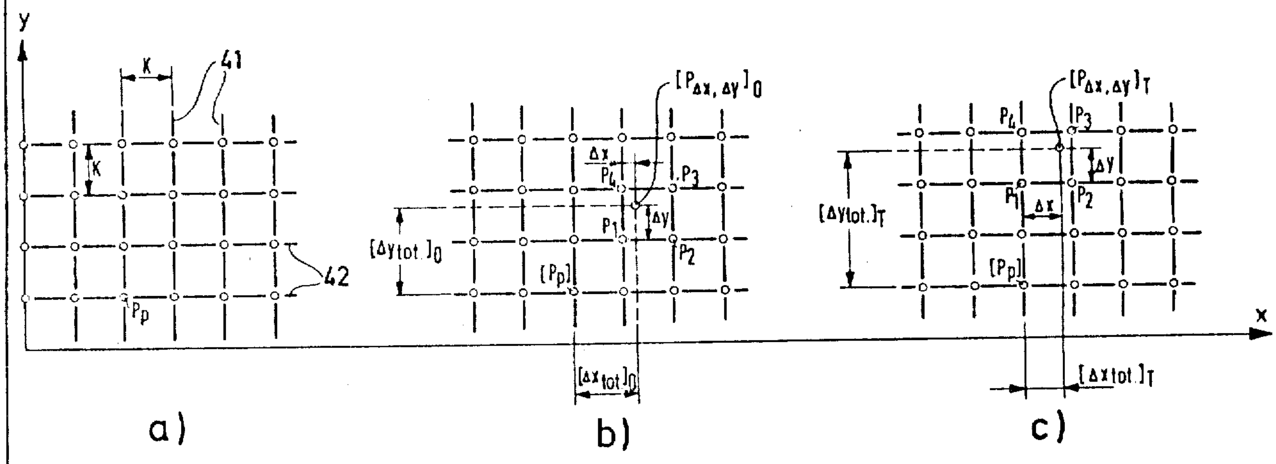

Fig.14

UNITED STATES PATENT OFFICE

CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

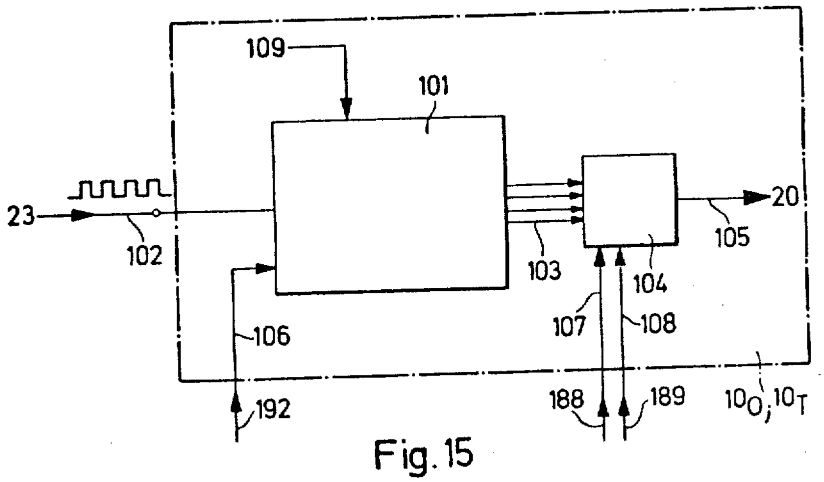

Fig. 15

UNITED STATES PATENT OFFICE

CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

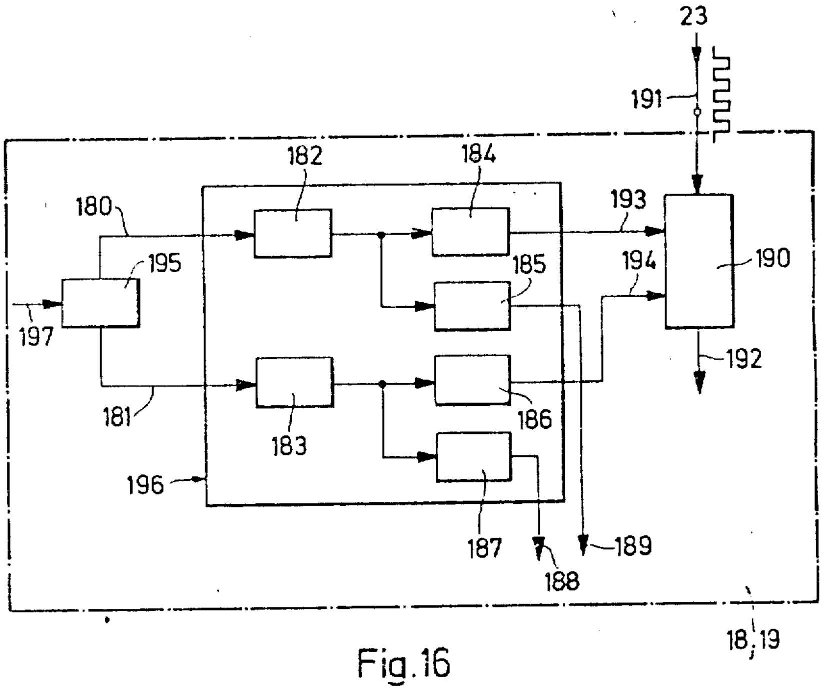

Fig.16

UNITED STATES PATENT OFFICE

CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

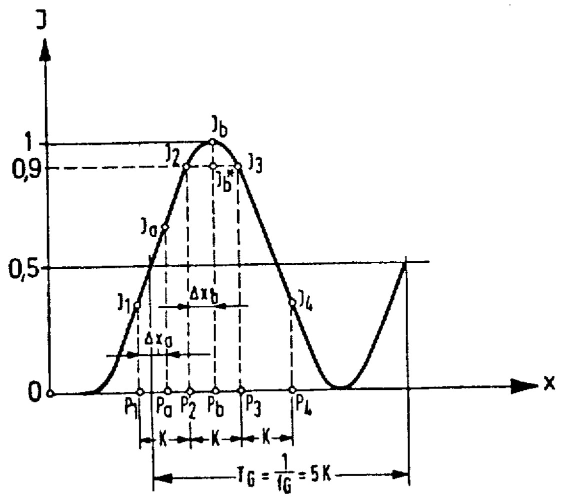

Fig.17

UNITED STATES PATENT OFFICE

CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

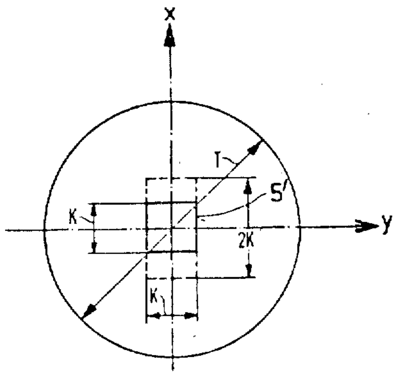

Fig.18

UNITED STATES PATENT OFFICE
CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

Fig.19

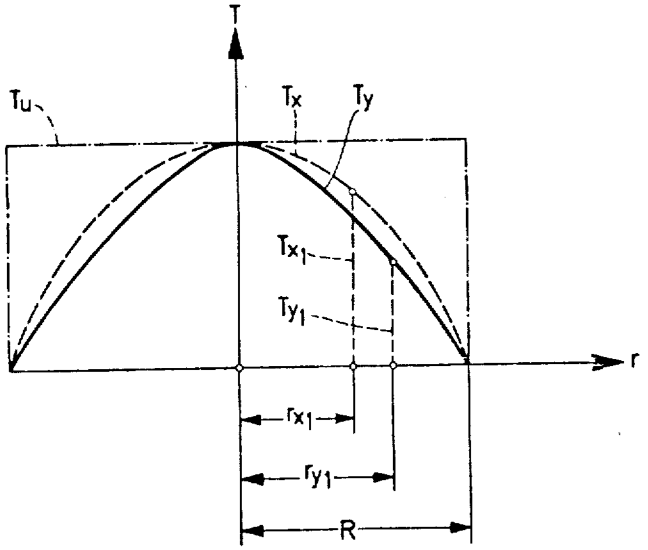

UNITED STATES PATENT OFFICE

CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

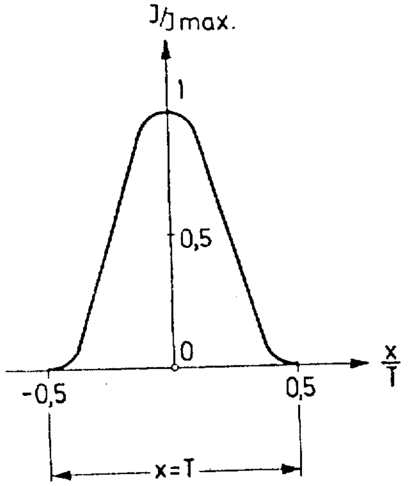

$$\frac{J}{J_{max.}} = \varphi\left(\frac{x}{T}\right) = \cos^2\pi\left(\frac{x}{T}\right)$$

Fig. 20

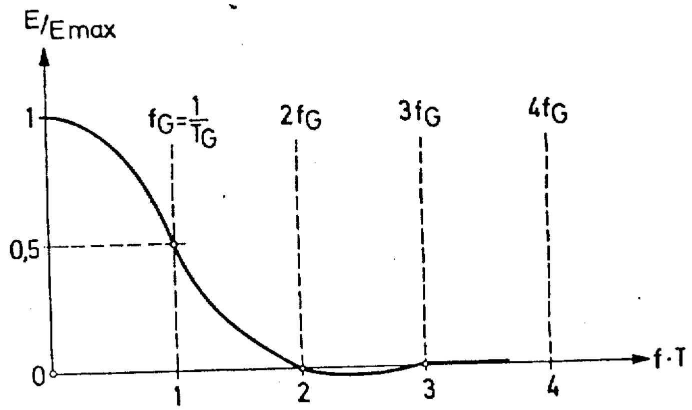

$$\frac{E}{E_{max.}} = \Phi(f\cdot T) = \frac{\sin\pi(f\cdot T)}{\pi(f\cdot T)[1-(f\cdot T)^2]}$$

Fig. 21

UNITED STATES PATENT OFFICE

CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

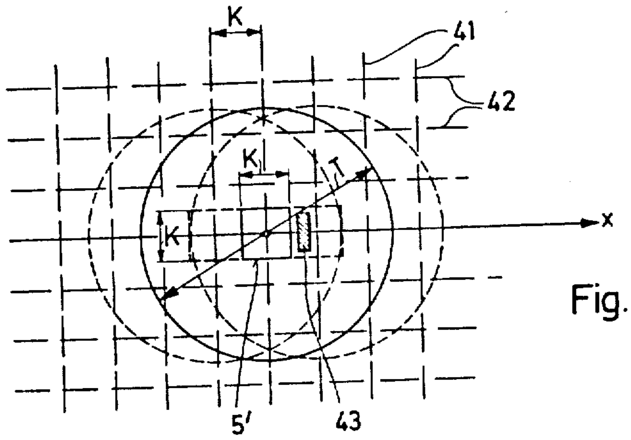

Fig. 22

UNITED STATES PATENT OFFICE

CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

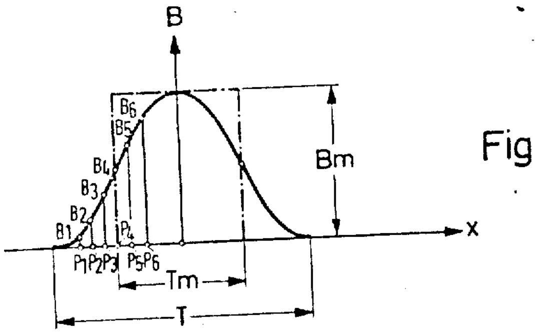

Fig. 23

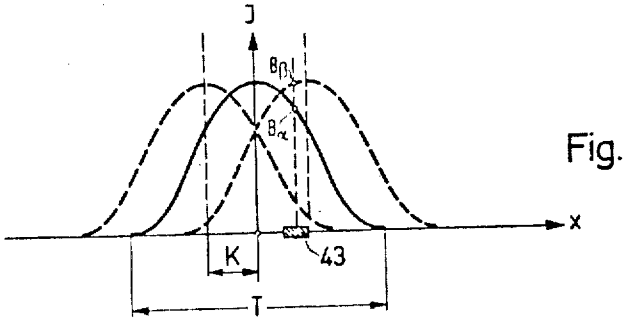

Fig. 24

UNITED STATES PATENT OFFICE
CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

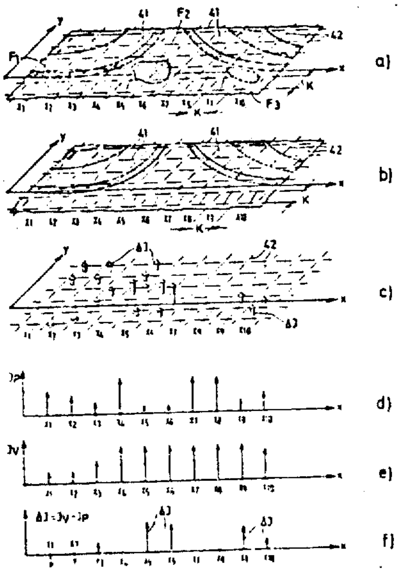

Fig. 25

UNITED STATES PATENT OFFICE

CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

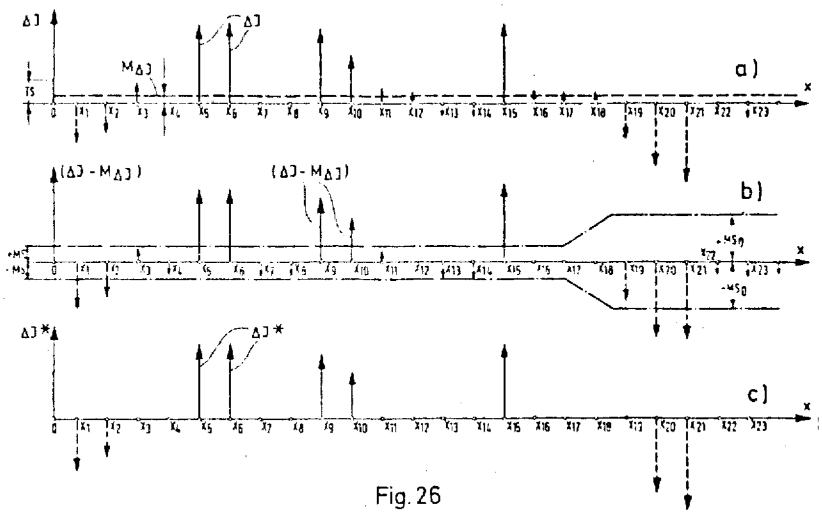

Fig. 26

UNITED STATES PATENT OFFICE
CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

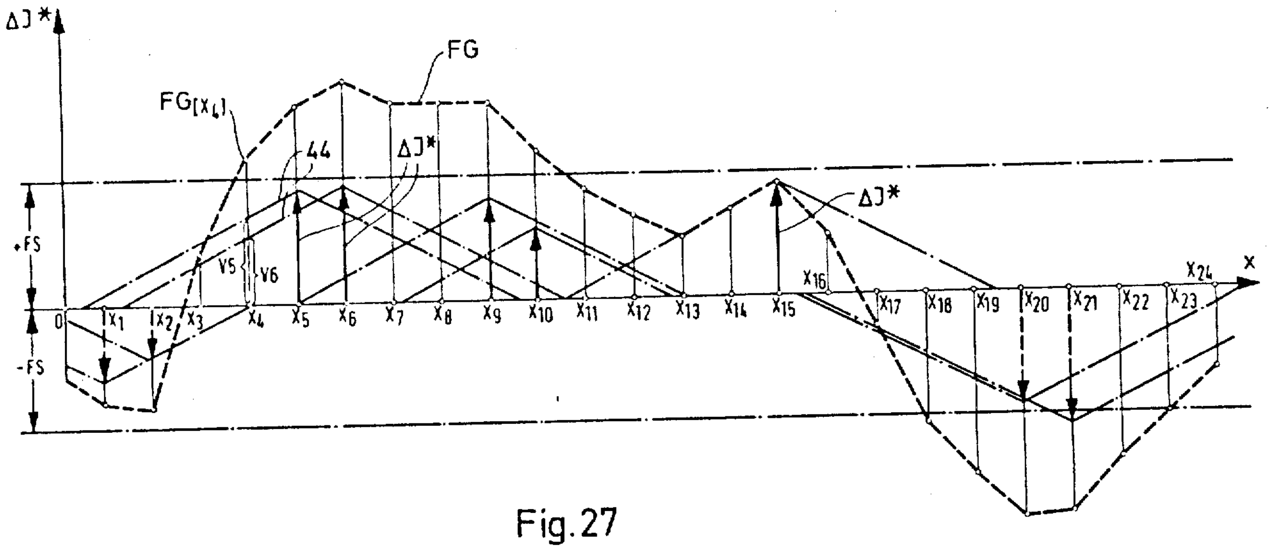

Fig.27

UNITED STATES PATENT OFFICE

CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

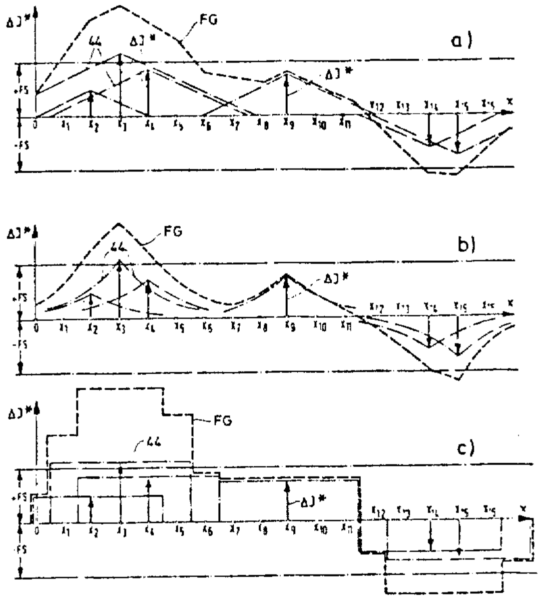

Fig. 28

UNITED STATES PATENT OFFICE

CERTIFICATE OF CORRECTION

Patent No. 4,143,279 Dated March 6, 1979

Inventor(s) Kurt Ehrat et al

It is certified that error appears in the above-identified patent and that said Letters Patent are hereby corrected as shown below:

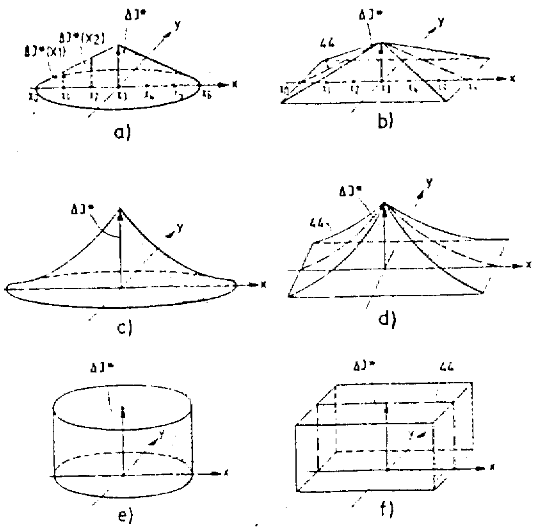

Fig 29

Signed and Sealed this

*Fifth* Day of *May 1981*

[SEAL]

*Attest:*

RENE D. TEGTMEYER

*Attesting Officer* *Acting Commissioner of Patents and Trademarks*